US010562796B2

(12) United States Patent
Imada et al.

(10) Patent No.: US 10,562,796 B2
(45) Date of Patent: Feb. 18, 2020

(54) LIQUID TREATMENT APPARATUS INCLUDING FIRST ELECTRODE, SECOND ELECTRODE, AND THIRD ELECTRODE, AND LIQUID TREATMENT METHOD USING LIQUID TREATMENT APPARATUS

(71) Applicant: Panasonic Intellectual Property Management Co., Ltd., Osaka (JP)

(72) Inventors: Katsumi Imada, Nara (JP); Masahiro Iseki, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 120 days.

(21) Appl. No.: 15/582,515

(22) Filed: Apr. 28, 2017

(65) Prior Publication Data

US 2017/0327390 A1 Nov. 16, 2017

(30) Foreign Application Priority Data

May 13, 2016 (JP) .................................. 2016-097445

(51) Int. Cl.
  *C02F 1/46* (2006.01)
(52) U.S. Cl.
  CPC ........ *C02F 1/4608* (2013.01); *C02F 2303/04* (2013.01)
(58) Field of Classification Search
  None
  See application file for complete search history.

(56) References Cited

U.S. PATENT DOCUMENTS

| | | | | |
|---|---|---|---|---|
| 3,536,885 A | * | 10/1970 | Mitchell | H05H 1/36 219/121.11 |
| 2009/0065352 A1 | * | 3/2009 | Kitsuka | D06F 39/007 204/230.7 |
| 2012/0211437 A1 | * | 8/2012 | Seaver | C02F 1/4674 210/748.01 |

(Continued)

FOREIGN PATENT DOCUMENTS

| | | | | |
|---|---|---|---|---|
| CN | 104583131 A | * | 4/2015 | ............... C02F 1/50 |
| JP | 2009-106910 | | 5/2009 | |

(Continued)

OTHER PUBLICATIONS

Imai Shinichi—CN 104583131 Machine Translation (Year: 2015).*

*Primary Examiner* — Bradley R Spies
(74) *Attorney, Agent, or Firm* — McDermott Will & Emery LLP

(57) ABSTRACT

A liquid treatment apparatus includes a housing for storing a liquid, a first electrode at least part of which is arranged in the housing, a second electrode, a third electrode, a first power supply that, in operation, applies a first voltage between the first electrode and the second electrode to make the first electrode held effectively positive with respect to the second electrode, and a second power supply that, in operation, applies a second voltage between the second electrode and the third electrode to make the third electrode held effectively negative with respect to the second electrode. Plasma is generated inside a bubble, which is present in the liquid, when the liquid is stored in the housing and the first power supply applies the first voltage between the first electrode and the second electrode.

12 Claims, 10 Drawing Sheets

(56) References Cited

U.S. PATENT DOCUMENTS

| | | | | |
|---|---|---|---|---|
| 2015/0225264 A1* | 8/2015 | Fujikane | .................... | C02F 1/50 |
| | | | | 210/748.17 |
| 2015/0251933 A1* | 9/2015 | Nakamura | ............ | C02F 1/4608 |
| | | | | 210/748.17 |
| 2015/0307370 A1* | 10/2015 | Kang | .................... | C02F 1/4608 |
| | | | | 205/756 |

FOREIGN PATENT DOCUMENTS

| JP | 2009-255027 | 11/2009 |
|---|---|---|
| JP | 2012-020264 | 2/2012 |
| JP | 2012-104486 | 5/2012 |
| JP | 2013-258159 | 12/2013 |

\* cited by examiner

LIQUID TREATMENT APPARATUS INCLUDING FIRST ELECTRODE, SECOND ELECTRODE, AND THIRD ELECTRODE, AND LIQUID TREATMENT METHOD USING LIQUID TREATMENT APPARATUS

BACKGROUND

1. Technical Field

The present disclosure relates to a liquid treatment apparatus and a liquid treatment method.

2. Description of the Related Art

Japanese Unexamined Patent Application Publication No. 2009-255027, for example, discloses one of related-art liquid treatment apparatuses utilizing high-voltage pulse discharge. FIG. 12 illustrates a configuration of a related-art sterilizer disclosed in Japanese Unexamined Patent Application Publication No. 2009-255027.

A sterilizer 1 illustrated in FIG. 12 is constituted by a discharge electrode 6 including a pair of a high-voltage electrode 2 having a columnar shape and a ground electrode 3 having a plate-like shape. The high-voltage electrode 2 is coated with an insulator 4 except for an end surface of a tip portion 2a, thus forming a high-voltage electrode portion 5. The tip portion 2a of the high-voltage electrode 2 and the ground electrode 3 are arranged in a treatment tank 6 in a state immersed in water 8, which is a treatment target, and opposing to each other with a predetermined electrode gas interposed therebetween. The high-voltage electrode 2 and the ground electrode 3 are connected to a power supply 9 that generates a high-voltage pulse. Discharge is caused by applying a negative high-voltage pulse of 2 to 50 kV/cm and 100 Hz to 20 kHz between both the electrodes. Bubbles 10 containing water vapor and jet flows 11 attributable to the bubbles 10 are generated due to evaporation of the water caused by applied energy and vaporization resulting from shock waves. In addition, plasma generated near the high-voltage electrode 2 produces OH, H, O, $O^{2-}$, $O^-$, and $H_2O_2$, which kill microorganisms and bacteria in the water 8.

SUMMARY

In one general aspect, the techniques disclosed here feature a liquid treatment apparatus including a housing for storing a liquid, a first electrode at least part of which is arranged in the housing, a second electrode, a third electrode, a first power supply that, in operation, applies a first voltage between the first electrode and the second electrode to make the first electrode held effectively positive with respect to the second electrode, and a second power supply that, in operation, applies a second voltage between the second electrode and the third electrode to make the third electrode held effectively negative with respect to the second electrode. Plasma is generated inside a bubble, which is present in the liquid, when the liquid is stored in the housing and the first power supply applies the first voltage between the first electrode and the second electrode.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
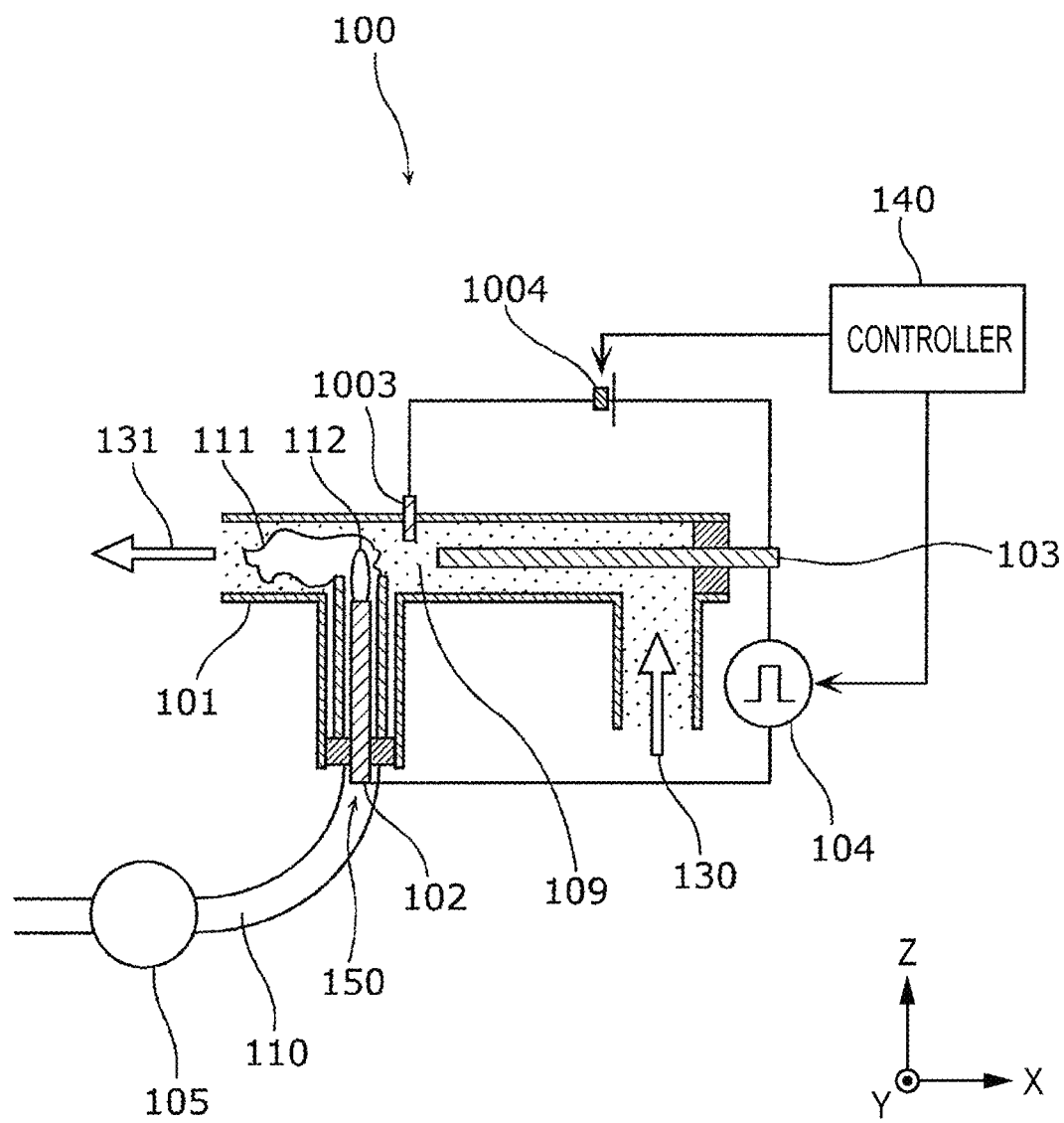
FIG. 1 is a schematic view illustrating an example of overall configuration of a liquid treatment apparatus according to a first embodiment.

In the sterilizer 1 disclosed in Japanese Unexamined Patent Application Publication No. 2009-255027, because the tip portion 2a of the high-voltage electrode 2 serves as a negative electrode, there occurs a phenomenon that water scale components, such as Ca and Mg, present in the treatment target water 8 precipitate on the tip portion 2a of the high-voltage electrode 2, and that the interelectrode resistance increases significantly. As a result, sustainability of the discharge is impeded, and water treatment performance of the sterilizer 1 is reduced. This gives rise to the problem that general tap water containing Ca, Mg, and other components cannot be used as the treatment target water, and hence versatility is insufficient.

One non-limiting and exemplary embodiment provides a liquid treatment apparatus capable of maintaining stable water treatment performance by re-dissolving, in treatment target water, water scale that contains minerals, such as Ca and Mg, and that has precipitated on an electrode.

Outlines of Present Disclosure

A liquid treatment apparatus according to one aspect of the present disclosure includes a housing for storing a liquid, a first electrode at least part of which is arranged in the housing, a second electrode, a third electrode, a first power supply that, in operation, applies a first voltage between the first electrode and the second electrode to make the first electrode held effectively positive with respect to the second electrode, and a second power supply that, in operation, applies a second voltage between the second electrode and the third electrode to make the third electrode held effectively negative with respect to the second electrode. Plasma is generated inside a bubble, which is present in the liquid, when the liquid is stored in the housing and the first power supply applies the first voltage between the first electrode and the second electrode.

Here, the bubble may cover at least part of the first electrode.

With the features described above, in the liquid treatment apparatus according to one aspect of the present disclosure, the first power supply applies the voltage between the first electrode and the second electrode to cause discharge, and the plasma generated with the discharge produces OH radicals, etc. Thus, the liquid treatment apparatus according to one aspect of the present disclosure can produce a liquid having oxidizing power. Furthermore, water scale (hereinafter referred to as a "precipitate") containing Ca and/or Mg and having deposited on the second electrode can be re-dissolved into the liquid with the second power supply applying the voltage between the second electrode and the third electrode. Thus, the precipitate having deposited on the second electrode can be removed. As a result, the liquid treatment apparatus according to one aspect of the present disclosure can suppress a rise of impedance between the first electrode and the second electrode, the rise being attributable to the precipitate having deposited on the second electrode. Stated in another way, stability of the plasma discharge can be suppressed from reducing with the rise of the impedance. Hence the liquid treatment apparatus according to one aspect of the present disclosure is able to continuously produce the liquid having oxidizing power, and to maintain the stable water treatment performance.

In the liquid treatment apparatus according to one aspect of the present disclosure, at least part of the second electrode may be arranged in the housing. In the liquid treatment apparatus according to one aspect of the present disclosure, at least part of the third electrode may be arranged in the housing.

In the liquid treatment apparatus according to one aspect of the present disclosure, the second electrode may be made of an inoxidizable material.

The above-described feature can suppress the occurrence of such an event that an oxide of a constituent material of the second electrode comes into a passive state and a current can no longer flow continuously.

In the liquid treatment apparatus according to one aspect of the present disclosure, the third electrode may be made of a material having a lower level of ionization tendency than hydrogen.

With the feature described above, oxidization of the third electrode can be suppressed when the voltage is applied between the second electrode and the third electrode. Thus, the service life of the third electrode is prolonged.

In the liquid treatment apparatus according to one aspect of the present disclosure, the second power supply may be a direct-current power supply.

With the feature described above, the voltage can be produced with a simple configuration of the power supply.

In the liquid treatment apparatus according to one aspect of the present disclosure, the second power supply may be a half-wave rectifier power supply.

With the feature described above, a half-wave rectified voltage can be easily produced using an AC power supply in standard homes.

The liquid treatment apparatus according to one aspect of the present disclosure may further include a gas supply unit that, in operation, supplies gas into the liquid, and the bubble may be generated with the gas supply unit supplying the gas into the liquid.

With the features described above, the bubble covering at least part of the first electrode can be easily generated, for example, by adjusting an amount of the gas supplied from the gas supply unit. Furthermore, when it is desired to produce particular substances, such as nitrogen radicals and ozone, with the plasma, those particular substances can be easily produced in the liquid treatment apparatus according to one aspect of the present disclosure by changing the type of the gas supplied from the gas supply unit.

In the liquid treatment apparatus according to one aspect of the present disclosure, the bubble may be generated through vaporization of the liquid, the vaporization being caused with application of the first voltage between the first electrode and the second electrode.

With the feature described above, the liquid treatment apparatus according to one aspect of the present disclosure makes it possible, for example, to generate the plasma and to treat the liquid with a relatively simple configuration not including the gas supply unit.

The liquid treatment apparatus according to one aspect of the present disclosure may further include a controller, the controller executing an operation of causing the first power supply to apply the first voltage between the first electrode and the second electrode, and generating the plasma inside the bubble, and after generation of the plasma, executing an operation of causing the second power supply to apply the second voltage between the second electrode and the third electrode, and cleaning the second electrode.

With the features described above, the precipitate having deposited on the second electrode during the discharge can be re-dissolved into the liquid by applying the voltage between the second electrode and the third electrode after the discharge between the first electrode and the second electrode. In other words, with the liquid treatment apparatus according to one aspect of the present disclosure, since the precipitate having deposited on the second electrode can be removed, a rise of impedance between the first electrode and the second electrode can be suppressed, the rise being attributable to the precipitate having deposited on the second electrode. Thus, the liquid treatment apparatus according to one aspect of the present disclosure can stably continue the plasma discharge. Hence the liquid treatment apparatus according to one aspect of the present disclosure is able to continuously produce the liquid having oxidizing power, and to maintain the stable water treatment performance.

A liquid treatment method according to one aspect of the present disclosure is used in a liquid treatment apparatus which includes a housing for storing a liquid, a first electrode at least part of which is arranged in the housing, a second electrode, and a third electrode. The method includes applying a first voltage between the first electrode and the second electrode to generate plasma inside a bubble that is present in the liquid, and after generating the plasma, applying a second voltage between the second electrode and the third electrode to perform cleaning of the second electrode.

With the features described above, the liquid treatment method according to one aspect of the present disclosure provides similar advantageous effects to those obtained with the above-described liquid treatment apparatus.

First Embodiment

A first embodiment will be described below with reference to FIGS. 1 to 8.

1-1. Configuration

A configuration of a liquid treatment apparatus according to the first embodiment is first described with reference to FIGS. 1 and 2.

FIG. 1 is a schematic view illustrating an example of overall configuration of a liquid treatment apparatus 100 according to the first embodiment. In FIG. 1, the liquid treatment apparatus 100 includes a housing 101, a first electrode 102, a second electrode 103, a third electrode 1003, a first power supply 104, a second power supply 1004, a gas supply unit 105, and a controller 140. As illustrated in FIG. 1, in the liquid treatment apparatus 100 according to this embodiment, the first electrode 102, the second electrode 103, and the third electrode 1003 are arranged inside the housing 101. In other words, the first electrode 102, the second electrode 103, and the third electrode 1003 are each at least partly immersed in treatment target water 109 present within the housing 101. The first power supply 104 is connected between the first electrode 102 and the second electrode 103, and it applies a voltage between both the electrodes. The second power supply 1004 is connected between the second electrode 103 and the third electrode 1003, and it applies a voltage between both the electrodes. The first power supply 104 and the second power supply 1004 are connected to the controller 140.

The gas supply unit 105 for supplying gas 110 into the housing 101 is connected to the first electrode 102. The supplied gas 110 forms a bubble 111 that covers the first electrode 102.

It is to be noted that, while this embodiment is described as including the gas supply unit 105, the gas supply unit 105 is not an essential component in the liquid treatment apparatus 100 according to the present disclosure. As described later, the liquid treatment apparatus 100 according to the present disclosure may be of the type not including the gas supply unit 105, namely of the type not supplying the gas 110.

1-1-1. Housing

As illustrated in FIG. 1, by way of example, the treatment target water 109 flows in the housing 101 from the upstream side (denoted by an arrow 130) toward the downstream side (denoted by an arrow 131). In other words, the housing 101 forms a flow path for the treatment target water 109. The interior of the housing 101 is, for example, filled with the treatment target water 109. More specifically, the housing 101 is, for example, a pipe through which the treatment target water 109 flows. The treatment target water 109 is not always needed to be flowing (moving) water and may be static water. Thus, the housing 101 may form a space for storing the treatment target water 109.

The housing 101 may be constituted in any shape and/or size insofar as it is a pipe-like member. A cross-section of the housing 101 may have, for example, one of rectangular, triangular, and other polygonal shapes. In particular, the housing 101 may be a circular cylindrical pipe having an inner diameter of 5 mm and made of a polymethyl methacrylate (PMMA) resin. The material of the housing 101 is not limited to the PMMA resin, and it may be any type of material having resistance to plasma and heat.

The housing 101 may be grounded to prevent electric shock.

1-1-2. Electrode Unit

An electrode unit 150 used in the liquid treatment apparatus 100 and including the first electrode 102 will be described below. The electrode unit 150 may have a simple configuration including only the first electrode 102. Alternatively, the electrode unit 150 may have any suitable one of other various configurations. For example, the electrode unit 150 may include an insulator that is arranged around the first electrode 102. In the following, as an example of the electrode unit 150 including the first electrode 102, an electrode unit 150a is described in which, as illustrated in FIG. 2, an insulator 106 is disposed to form a space around a first electrode 102a.

Figure 2:
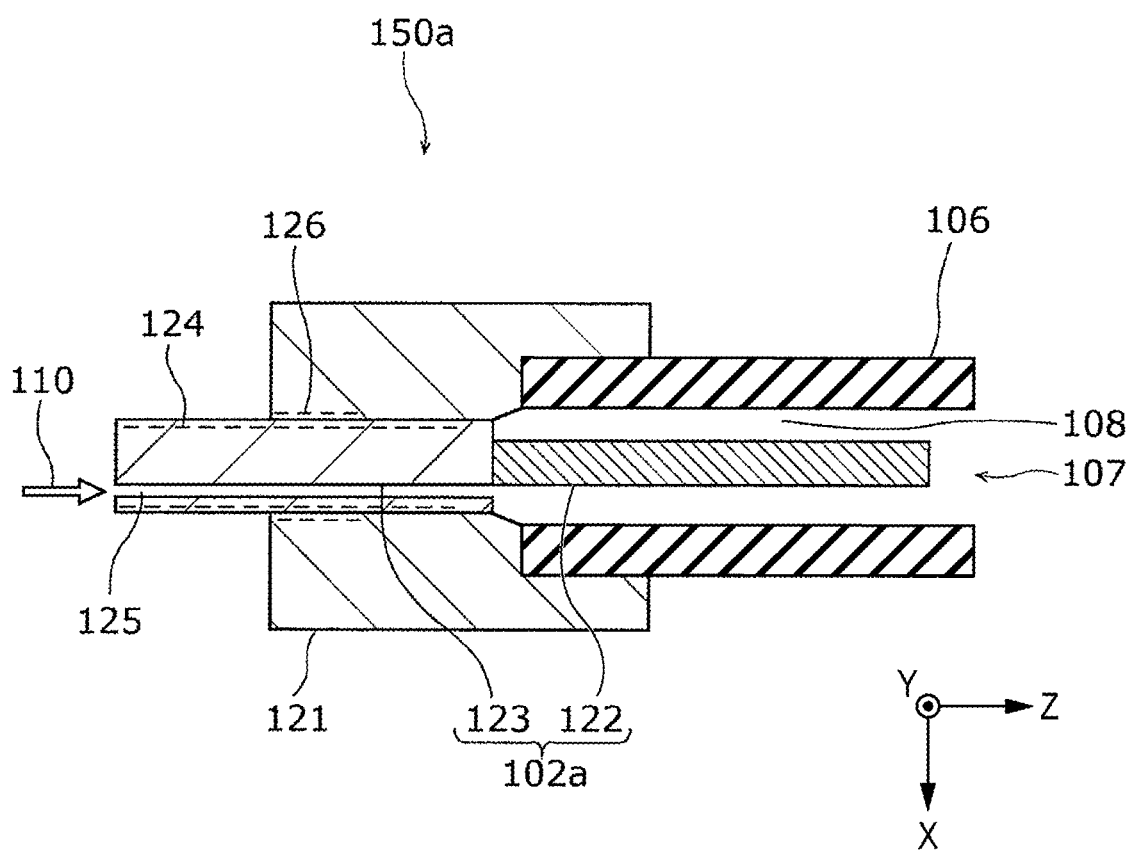
FIG. 2 is a sectional view illustrating an example of configuration of an electrode unit in the liquid treatment apparatus according to the first embodiment.

FIG. 2 is a sectional view illustrating an example of the electrode unit 15a in the liquid treatment apparatus according to 100 to the first embodiment. The electrode unit 150a illustrated in FIG. 2 includes the first electrode 102a, the insulator 106, and a holding block 121.

The first electrode 102a includes a metal electrode portion 122 arranged within the housing 101, and a metal fixation portion 123 that is fixedly connected to the holding block 121 and that is connected to the first power supply 104. The insulator 106 is disposed around the metal electrode portion 122 and forms a space 108. Thus, the space 108 is defined between the insulator 106 and the metal electrode portion 122. Moreover, the insulator 106 has an opening 107 that communicates the interior of the housing 101 and the space 108 with each other.

The metal fixation portion 123 includes a screw portion 124 formed in its outer periphery, and a through-hole 125 formed therein. The gas supply unit 105 supplies the gas 110 to the space 108 via the through-hole 125. The supplied gas 110 is released as the bubble 111 into the treatment target water 109 from the opening 107. The holding block 121 includes a screw portion 126 that is formed in its inner surface to be meshed with the screw portion 124 of the metal fixation portion 123.

The electrode unit 150a is held by the housing 101 with the aid of the holding block 121.

1-1-2-1. First Electrode

The first electrode 102a is at least partly arranged within the housing 101. The first electrode 102a functions as a reaction electrode in a process of generation of plasma 112. As described above, the first electrode 102a includes the metal electrode portion 122 and the metal fixation portion 123. The metal electrode portion 122 and the metal fixation portion 123 may be formed of metals having different sizes and/or made of different materials. The metal electrode portion 122 may be made of, for example, a metal material, such as tungsten or a tungsten alloy, having a circular columnar shape with a diameter of 0.8 mm and having resistance to plasma. The metal fixation portion 123 may be made of, for example, a SUS material or a copper alloy material, having a circular columnar shape with a diameter of 4 mm.

The size and the material of the metal electrode portion 122 are not limited to the above-mentioned examples. The diameter of the metal electrode portion 122 is just needed to have such a value as allowing the plasma 112 to generate, and it may be, for example, 2 mm or less. Furthermore, the shape of the metal electrode portion 122 is not limited to the circular columnar shape. Part of the metal electrode portion 122 positioned inside the housing 101 may have a columnar shape having a diameter that is substantially not changed from one end to the other end. An electrode having such a columnar shape is able to suppress an electric field from excessively concentrating at a tip portion, and to avoid the electrode from deteriorating with use in comparison with the case where the electrode has a needle-like shape, namely a shape gradually thinning toward an end and having substantially no thickness at the foremost end point. The material of the metal electrode portion 122 is not limited to tungsten or a tungsten alloy, and it may be provided by another metal material having resistance to plasma. Though being poorer in durability, the material of the metal electrode portion 122 may be, for example, copper, aluminum, iron, platinum, or an alloy of those elements. In addition, yttrium oxide added with a conductive substance may be thermally sprayed over part of a surface of the metal electrode portion 122. The yttrium oxide added with a conductive substance has an electrical resistivity of, e.g., 1 to 30 Ωcm. The thermal spray of the yttrium oxide prolongs the service life of the electrode.

The size and the material of the metal fixation portion 123 are also not limited to the above-mentioned examples. The diameter of the metal fixation portion 123 is not limited to 4 mm and may be optionally set insofar as the diameter of the metal fixation portion 123 is larger than that of the metal electrode portion 122. Furthermore, the material of the metal fixation portion 123 is just needed to be a metal material that is easy to work. The material of the metal fixation portion 123 may be provided by one of copper, zinc, aluminum, tin, brass, etc., which are materials used in general screws.

The first electrode 102a may be formed, for example, by press-fitting the metal electrode portion 122 to the metal fixation portion 123. As described above, the metal material having high resistance to plasma is used as the metal electrode portion 122, and the metal material being easy to work is used as the metal fixation portion 123. It is hence possible to obtain the first electrode 102a that has resistance to plasma, a relatively low production cost, and more stable characteristics.

Alternatively, the metal electrode portion 122 and the metal fixation portion 123 may be formed by a casting process using the same material or different materials.

A through-hole 125 connected to the gas supply unit 105 is formed in the metal fixation portion 123. The trough-hole 125 is communicated with the space 108 defined between the insulator 106 and the metal electrode portion 122. Thus, the gas 110 from the gas supply unit 105 is supplied to the space 108 via the through-hole 125.

The metal electrode portion 122 is covered with the gas 110 supplied via the through-hole 125. When only one through-hole 125 is formed, the through-hole 125 may be formed in the lower side of the metal electrode portion 122 in the direction of gravitational force, as illustrated in FIG. 2. With the through-hole 125 formed in the lower side of the metal electrode portion 122 in the direction of gravitational force, the metal electrode portion 122 is more easily covered with the gas 110 supplied from the gas supply unit 105. When two or more through-holes 125 are formed, a pressure loss attributable to the presence of the through-hole 125 can be suppressed. The through-hole 125 may be, for example, a circular columnar hole having a diameter of 0.3 mm. However, the shape and the size of the through-hole 125 are not limited to the above-mentioned examples.

By way of example, the screw portion 124 is provided in an outer periphery of the metal fixation portion 123. When the screw portion 124 in the outer periphery of the metal fixation portion 123 is in the form of a male screw, for example, the screw portion 126 in the form of a female screw is provided in the holding block 121. The first electrode 102a can be fixed to the holding block 121 by meshing the screw portion 124 and the screw portion 126 with each other. Furthermore, a position of an end surface of the metal electrode portion 122 relative to the opening 107 defined in the insulator 106 can be accurately adjusted by rotating the metal fixation portion 123. In addition, since the metal fixation portion 123 is fixedly connect to the first power supply 104 through the screw portion 124, contact resistance between the first power supply 104 and the first electrode 102a can be stabilized, and characteristics of the first electrode 102a can be stabilized. When the gas supply unit 105 and the first electrode 102a are fixedly connected to each other through the screw portion 124, reliable connection between the gas supply unit 105 and the first electrode 102a can be obtained. Those contrived structures contribute to ensuring waterproof properties and safety in practical use.

The screw portion 124 is not essential. Because the metal fixation portion 123 is just needed to be fixed to the holding block 121 in a properly positioned state, the metal fixation portion 123 may be fixed to the holding block 121 by bonding with an adhesive, press-fitting, or simultaneous forming, for example.

1-1-2-2. Insulator

The insulator 106 is arranged so as to form the space 108 around the metal electrode portion 122 of the first electrode 102a, and it has insulation properties. The gas 110 is supplied to the space 108 from the gas supply unit 105, and the metal electrode portion 122 is covered with the supplied gas 110. Accordingly, during discharge, an outer peripheral surface of the metal electrode portion 122 is not directly contacted with the treatment target water 109 although a conductor constituting the metal electrode portion 122 is exposed. The insulator 106 may have a circular cylindrical shape with an inner diameter of 1 mm, for example. However, the size and the shape of the insulator 106 are not limited to those examples. A central axis of the insulator 106 and a central axis of the metal electrode portion 122 may be arranged in alignment with each other. In other words, a central axis of the space 108 and the central axis of the metal electrode portion 122 may be arranged in alignment with each other. With such an arrangement, the gas 110 supplied from the gas supply unit 105 is uniformly delivered to the interior of the space 108.

The insulator 106 has the opening 107. The opening 107 has a function of determining a size of the bubble 111 when the bubble 111 is released into the treatment target water 109 inside the housing 101. The opening 107 is, for example, in the form of a circular columnar hole. The opening 107 may be formed such that a central axis of the opening 107 and the central axis of the metal electrode portion 122 may be aligned with each other. The insulator 106 may be made of a material such as alumina ceramic (aluminum oxide), magnesium oxide, yttrium oxide, insulating plastic, glass, or quartz, for example.

The opening 107 of the insulator 106 may be disposed at a position facing the end surface of the metal electrode portion 122, as illustrated in FIG. 2. Alternatively, the opening 107 may be formed at a position facing a lateral surface of the metal electrode portion 122. Thus, the position of the opening 107 is not limited to particular one. The opening 107 may be formed in a plural number in the insulator 106. The opening 107 of the insulator 106 may have a circular columnar shape with a diameter of 1 mm, for example. However, the shape and the size of the opening 107 are not limited to those examples. The diameter of the opening 107 may be in the range of 0.3 mm to 2 mm, for example.

1-1-2-3. Holding Block

The holding block 121 is an example of an insulating holding member that is connected to the metal fixation portion 123 of the first electrode 102a and to the insulator 106 for holding them. In this embodiment, the holding block 121 is made of a heat-resistant resin material or a ceramic. For example, a material obtained by impregnating glass fibers with an epoxy resin, or an alumina ceramic can be used. The holding block 121 may have a sealing structure to prevent leakage of the treatment target water 109 at each of a portion connected to the first electrode 102a and a portion connected to the insulator 106. The holding block 121 may have, for example, a structure including the screw portion 126 that is formed therein to fixedly hold the metal fixation portion 123 of the first electrode 102a through meshing between the screw portions. The holding block 121 is not limited to the above-described structure, and it may have any suitable structure.

1-1-2-4. Arrangement of First Electrode

As illustrated in FIG. 1, the first electrode 102a in this embodiment is arranged such that a lengthwise direction of the first electrode 102a is perpendicular to the flowing direction of the treatment target water 109 in the housing 101 (i.e., the direction denoted by the arrow 131 in FIG. 1). With the arrangement of the first electrode 102a illustrated in FIG. 1, the bubble 111 can be suppressed from stagnating around the first electrode 102a. The bubble 111 is formed, for example, by the gas 110 supplied from the gas supply unit 105. Stated in another way, as illustrated in FIG. 1, the lengthwise direction of the first electrode 102a is set perpendicularly to the direction in which the treatment target water 109 flows in the housing 101 from the second electrode 103 toward the first electrode 102a. With such setting, the bubble 111 can be suppressed from stagnating around the first electrode 102a. It is to be noted that the lengthwise direction of the first electrode 102a and the flowing direction of the treatment target water 109 are just needed to intersect each other in terms of vector directions. By way of example, one end of the first electrode 102a may actually project or may not actually project into the flow path.

The arrangement of the first electrode 102a is not limited to the above-described one. The first electrode 102a may be arranged such that the lengthwise direction of the first electrode 102a is oriented in an optional direction relative to the flowing direction of the treatment target water 109 in the housing 101 (denoted by the arrow 131 in FIG. 1). In an example, the first electrode 102a may be arranged such that the treatment target water 109 flowing in the housing 101 is directed toward a lateral surface of the first electrode 102a. As an alternative, the first electrode 102a may be arranged such that the lengthwise direction of the first electrode 102a forms an angle of, e.g., 45° relative to the flowing direction of the treatment target water 109.

1-1-3. Second Electrode

The second electrode 103 is at least partly arranged in the housing 101. The second electrode 103 functions as a counter electrode with respect to the first electrode 102a in the process of generation of the plasma 112. By way of example, the second electrode 103 may have a circular columnar shape with a diameter of 1 mm and may be obtained by forming a platinum film on a surface of a base material made of titanium. However, the shape and the size of the second electrode 103 are not limited to those examples. The second electrode 103 may be made of an inoxidizable material. The inoxidizable material is, for example, platinum, gold, carbon, or the like. Alternatively, the second electrode 103 may be made of a material of which electrical conductivity is substantially not changed even when oxidized, or a material that is hard to be oxidized.

A distance between the first electrode 102a and the second electrode 103 may be 5 mm, for example. In this embodiment, the second electrode 103 is arranged upstream of the first electrode 102a (i.e., on the side nearer to the arrow 130 in FIG. 1). Furthermore, in this embodiment, the lengthwise direction of the first electrode 102a and a lengthwise direction of the second electrode 103 are arranged in a substantially orthogonal relation. The distance between the first electrode 102a and the second electrode 103 and the arrangement of both the electrodes are just needed to be capable of causing the generation of the plasma 112, and are not limited to the above-described ones.

In the liquid treatment apparatus 100 including the housing 101, there is a tendency that, as the flow path through which the treatment target water 109 flows is restricted to a larger extent, a resistance value of an electrical path between the first electrode 102a and the second electrode 103 is increased and the discharge between the first electrode 102a and the second electrode 103 is less apt to occur. Therefore, the distance between the first electrode 102a and the second electrode 103 may be appropriately set depending on the inner diameter of the housing 101, which specifies the flow path. When ordinary tap water is used as the treatment target water 109, it is found that discharge occurs without problems even at the distance of 40 mm between the first electrode 102a and the second electrode 103 on condition of the flow path having a diameter of about 5 mm.

1-1-4. Third Electrode

The third electrode 1003 is at least partly arranged in the housing 101. The third electrode 1003 functions as a counter electrode with respect to the second electrode 103 when the second electrode 103 is subjected to cleaning. By way of example, the third electrode 1003 may have a circular columnar shape with a diameter of 1 mm and may be made of tungsten. However, the shape and the size of the third electrode 1003 are not limited to those examples. The third electrode 1003 may be made of a material having a lower level of ionization tendency than hydrogen. The third electrode 1003 may be made of an inoxidizable material. In an example, the third electrode 1003 and the second electrode 103 are made of the same material.

A distance between the second electrode 103 and the third electrode 1003 may be 10 mm, for example. In this embodiment, the third electrode 1003 is arranged between the first electrode 102a and the second electrode 103. The distance between the second electrode 103 and the third electrode 1003 and the arrangement of both the electrodes are just needed to be capable of allowing a current to flow between the second electrode 103 and the third electrode 1003. Thus, the third electrode 1003 is not always needed to be arranged between the first electrode 102a and the second electrode 103. Even when the third electrode 1003 is not disposed in the housing 101 unlike the first electrode 102a and the second electrode 103, it is just needed for the third electrode 1003 that electrical connection with respect to the second electrode 103 is secured through the treatment target water 109 and a current is allowed to flow therebetween with application of a voltage. When the distance the second electrode 103 and the third electrode 1003 is large, a voltage of the second power supply 1004 may be set to a higher level.

1-1-5. First Power Supply

The first power supply 104 is connected to be capable of applying a voltage between the first electrode 102a and the second electrode 103 that the first electrode 102a is held effectively positive with respect to the second electrode 103. The voltage applied to the first electrode 102a with respect to the second electrode 103 may be always positive. When the voltage applied to the first electrode 102a with respect to the second electrode 103 is positive in a period and negative in another period, the average voltage applied to the first electrode 102a with respect to the second electrode 103 may be positive. The first power supply 104 applies a pulse voltage or an alternate-current (AC) voltage between the first electrode 102a and the second electrode 103. A voltage waveform may be, for example, any suitable one of a pulsed waveform, a half sine waveform, and a sine waveform. In the case of applying a pulse voltage, the first power supply 104 may apply the so-called bipolar pulse voltage; namely, it may alternately apply a positive pulse voltage and a negative pulse voltage. In an example, the first power supply 104 may have an output capacity of 80 VA and may apply such a voltage as exhibiting a peak voltage of 10 kV in an unloaded state. A peak value of the positive voltage applied to the first electrode 102a may be larger than a peak value of the negative voltage in order that the voltage applied to the first electrode 102a is held effectively positive with respect to the second electrode 103.

The first power supply 104 is connected to the controller 140, and the applied voltage and the timing of applying the voltage are controlled by the controller 140.

1-1-6. Second Power Supply

The second power supply 1004 is connected to be capable of applying a voltage between the second electrode 103 and the third electrode 1003 that the third electrode 1003 is held effectively negative with respect to the second electrode 103. The voltage applied to the third electrode 1003 with respect to the second electrode 103 may be always negative. When the voltage applied to the third electrode 1003 with respect to the second electrode 103 is positive in a period and negative in another period, the average voltage applied to the third electrode 1003 with respect to the second electrode 103 may be negative. The second power supply 1004 applies a direct-current (DC) voltage or a half-wave rectified voltage between the second electrode 103 and the third electrode 1003. The DC voltage is, for example, a constant voltage. The half-wave rectified voltage is, for example, a sine or rectangular wave voltage having an extreme duty ratio. In an example, the second power supply 1004 may supply electric power of 15 V and 100 mA.

The second power supply 1004 is connected to the controller 140, and the applied voltage and the timing of applying the voltage are controlled by the controller 140.

1-1-7. Gas Supply Unit

The gas supply unit 105 is connected to the metal fixation portion 123 of the first electrode 102a. The gas supply unit 105 supplies the gas 110 to the space 108 via the through-hole 125 in the metal fixation portion 123. For example, air, He, Ar, or $O_2$ is used as the gas 110 to be supplied. In this embodiment, a supply rate of the gas from the gas supply unit 105 is not limited to a particular value. The gas supply unit 105 may have a capacity capable of supplying the gas at 1 liter/min, for example. The gas supply unit 105 may be constituted by a pump, for example.

In the example illustrated in FIG. 2, the gas 110 supplied from the gas supply unit 105 forms the bubble 111 covering the surface of the metal electrode portion 122 that is a conductor-exposed portion of the first electrode 102a. The gas supply unit 105 may supply the gas to the flow path along which the treatment target water 109 flows in the housing 101, for example, from the lower side in the direction of gravitational force.

In the present disclosure, the expression "the surface of the metal electrode portion 122 is not directly contacted with the treatment target water 109" stands for that the surface of the metal electrode portion 122 is not contacted with a liquid present as a large mass within the housing 101. Accordingly, the state where "the surface of the metal electrode portion 122 is not directly contacted with the treatment target water 109" includes such a state where the surface of the metal electrode portion 122 is wetted with the treatment target water 109 (strictly speaking, the surface of the metal electrode portion 122 is contacted with the treatment target water 109), and where the gas 100 in the bubble 111 covers the wetted surface of the metal electrode portion 122. That state may occur, for example, when the bubble 111 is generated under a condition that a surface of the first electrode 102a is wetted with a liquid.

1-1-8. Controller

The controller 140 is constituted by a microcomputer, for example, and it serves as a processing unit that controls an operation of the liquid treatment apparatus 100. The controller 140 is connected to the first power supply 104 and the second power supply 1004, and it controls not only the voltages applied from the first power supply 104 and the second power supply 1004, but also the timings of applying the voltages and stopping the application of the voltages.

More specifically, the controller 140 controls the first power supply 104 and applies the voltage between the first electrode 102a and the second electrode 103, thereby generating the plasma 112 inside the bubble 111. The controller 140 executes control to apply the voltage between both the electrodes in order, for example, that an effectively positive voltage is applied to the first electrode 102a with the second electrode 103 being a reference.

After stopping the application of the voltage from the first power supply 104, the controller 140 controls the second power supply 1004 and applies the voltage between the second electrode 103 and the third electrode 1003, thereby removing the precipitate that has deposited on the second electrode 103. The controller 140 executes control to apply the voltage between both the electrodes in order, for example, that an effectively negative voltage is applied to the third electrode 1003 with the second electrode 103 being a reference. In other words, the controller 140 applies the voltages having opposite polarities between the first electrode 102a and the second electrode 103 and between the second electrode 103 and the third electrode 1003 with the second electrode 103 being a reference. The timings of applying the voltages and stopping the application of the voltages from the first power supply 104 and the second power supply 1004 will be described later.

1-2. Operation

The operation of the liquid treatment apparatus 100 according to this embodiment will be described below with reference to FIGS. 3 to 8.

1-2-1. Mechanisms of Precipitation and Removal of Precipitate

First, the treatment target water 109 to be treated is supplied to the housing 101. Here, the treatment target water 109 is assumed to be ordinary tap water containing Ca and/or Mg compounds, such as $CaCO_3$ (calcium carbonate), $MgCO_3$ (magnesium carbonate), and $Mg(OH)_2$ (magnesium hydroxide). The treatment target water 109 supplied to the housing 101 flows in the housing 101 from the upstream side (denoted by the arrow 130 in FIG. 1) to the downstream side (denoted by the arrow 131 in FIG. 1).

The gas supply unit 105 supplies, via the through-hole 125 in the first electrode 102a, the gas 110 to the space 108 that is defined between the insulator 106 and the metal electrode portion 122 of the first electrode 102a. The supplied gas 110 is continuously released into the treatment target water 109 in the housing 101 from the opening 107 of the insulator 106. Thus, as described above, the bubble 111 covering the metal electrode portion 122 (i.e., the conductor exposed portion) of the first electrode 102a and part of the interior of the housing 101 on the downstream side is formed in the treatment target water 109. In other words, the metal electrode portion 122 of the first electrode 102a comes into a state that it is always covered with the bubble 111 formed by the gas 110. Furthermore, the bubble 111 covers the opening 107 of the insulator 106 with the gas 110 in the bubble 111. The bubble 111 is formed over a certain distance from the opening 107 of the insulator 106. Thus, in this embodiment, the opening 107 of the insulator 106 functions also as a portion for generating the bubble 111.

In the state where the metal electrode portion 122 is covered with the bubble 111, the controller 140 controls the first power supply 104 to apply the voltage between the first electrode 102a and the second electrode 103. More specifically, the controller 140 controls the first power supply 104 to apply the voltage between both the electrodes in order that an effectively positive voltage is applied to the first electrode 102a with the second electrode 103 being a reference. Upon the application of the voltage between the first electrode 102a and the second electrode 103, discharge occurs inside the bubble 111. With the occurrence of the discharge, the plasma 112 generates from the vicinity of the metal electrode portion 122 of the first electrode 102a toward the inside of the bubble 111. The plasma 112 produces OH radicals, etc. in the treatment target water 109, and these products sterilize the treatment target water 109 or decompose the chemical substances contained in the treatment target water 109. The plasma 112 is generated over a wide region including not only the bubble 111 at the tip portion of the first electrode 102a, but also the bubble 111 in the space 108. This is resulted from the fact that the treatment target water 109 acts as a counter electrode with interposition of the insulator 106. A large amount of ions are generated due to the above-described mechanism including the last-mentioned effect as well, and a large amount of radicals are produced in the treatment target water 109. This is a great effect resulting from the arrangement that the first electrode 102a is positioned in the treatment target water 109 like the present disclosure.

In the plasma discharge, the vicinity of the second electrode 103 locally comes into a state having a high pH value (i.e., an alkalized state). Such a phenomenon locally occurs even when the flow of the treatment target water 109 is present. With the local alkalization, a dissolution characteristic deteriorates in the vicinity of the second electrode 103. Here, the dissolution characteristic represents a concentration of Ca and/or Mg compounds, such as $CaCO_3$ (calcium carbonate), $MgCO_3$ (magnesium carbonate), and $Mg(OH)_2$ (magnesium hydroxide), which are dissoluble into the treatment target water 109. The deterioration of the dissolution characteristic leads to reduction in an amount of those compounds dissoluble into the treatment target water 109, i.e., reduction in a dissoluble concentration. Accordingly, the alkalization causes a phenomenon that the Ca and/or Mg compounds precipitate on the second electrode 103 in an amount exceeding the dissoluble concentration. In the following description, the Ca and/or Mg compounds having deposited on the second electrode 103 are collectively called the precipitate.

Figure 3:
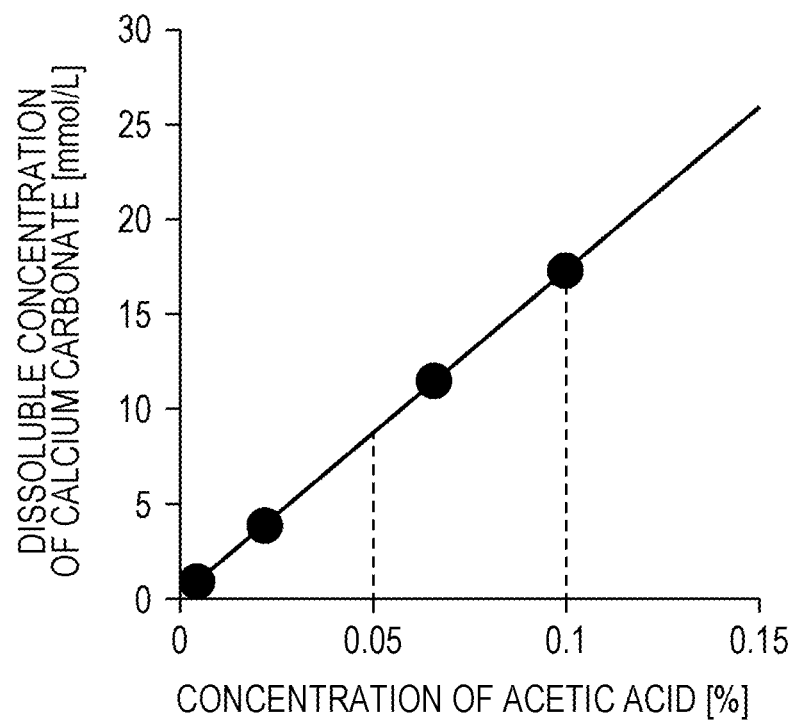
FIG. 3 is a graph plotting a solubility characteristic of calcium carbonate with respect to pH change of a solvent.

FIG. 3 is a graph plotting a solubility characteristic of calcium carbonate with respect to pH change of a solvent. The horizontal axis denotes a concentration of an acetic acid, i.e., pH of the solvent. As the concentration of the acetic acid lowers, the pH of the solvent takes a higher value. The vertical axis denotes a concentration of calcium carbonate dissoluble into the solvent. As seen from FIG. 3, as the concentration of the acetic acid lowers, namely as the pH of the solvent increases, the dissoluble concentration of calcium carbonate into the solvent takes a lower value. This indicates that, as the pH of the solvent increases, the amount of calcium carbonate dissoluble into the solvent reduces, and hence that the precipitate is more likely to deposit on the second electrode.

A rise of impedance between the first electrode 102a and the second electrode 103 attributable to the deposition of the precipitate affects the plasma discharge and brings about a situation where it is difficult to generate excitation, thereby reducing stability of the plasma discharge. This leads to a difficulty in stably producing a liquid with oxidizing power, and reduction in water treatment performance of the liquid treatment apparatus.

To cope with the above-described problem, the controller 140 in the liquid treatment apparatus 100 according to the present disclosure controls, after stopping the application of the voltage from the first power supply 104, the second power supply 1004 to apply the DC voltage between the second electrode 103 and the third electrode 1003. More specifically, the controller 140 controls the second power supply 1004 and applies the voltage between both the electrodes in order that an effectively negative voltage is applied to the third electrode 1003 with the second electrode 103 being a reference. In other words, the controller 140 controls the first power supply 104 and the second power supply 1004 in order that the voltages having opposite polarities are applied to the first electrode 102a and the third electrode 1003 with the second electrode 103 being a reference. A current flowing between the second electrode 103 and the third electrode 1003 causes a phenomenon that the pH in the vicinity of the second electrode 103 lowers. As a result, the dissoluble concentration of the precipitate increases in the vicinity of the second electrode 103, thereby giving rise to a phenomenon that the re-dissolution of the precipitate into the treatment target water 109 is promoted. Hence at least part of the precipitate having deposited on the second electrode 103 is removed. Hence the plasma discharge can be stably resumed. In the following description, a process of applying the voltage between the second electrode 103 and the third electrode 1003 and removing at least part of the precipitate having deposited on the second electrode 103 (namely, re-dissolving at least part of the precipitate into the treatment target water 109) is called "electrode refreshing".

When the second electrode 103 is in a state susceptible to oxidization and an oxide of the constituent material of the second electrode 103 comes into a passive state as described above, it is impossible to continuously flow a current and to implement a continuous re-dissolution process any longer. In other words, using an inoxidizable material as the second electrode 103 makes it possible to continuously flow a current to the second electrode 103. The second electrode 103 in this embodiment is obtained by employing titanium as a base material, and by forming a platinum film, which is an inoxidizable material, over a surface of the base material.

In the liquid treatment apparatus 100 according to this embodiment, as illustrated in FIG. 1, the second electrode 103 is arranged on the upstream side of the first electrode 102a.

Furthermore, in the liquid treatment apparatus 100, the first electrode 102a is arranged such that the lengthwise direction of the first electrode 102a is perpendicular to the flowing direction of the treatment target water 109 in the housing 101. Therefore, the bubble 111 generated from the first electrode 102a does not stagnate around the first electrode 102a, and flows to the downstream side of the housing 101. As a result, heat generated with the occurrence of the plasma 112 can be dissipated efficiently.

1-2-2. Case of Performing Only Plasma Discharge

As described above, when the plasma discharge occurs between the first electrode 102a and the second electrode 103, the pH in the vicinity of the second electrode 103 increases and calcium carbonate, etc. dissolved in the treatment target water 109 deposit as the precipitate on the second electrode 103.

Figure 4:
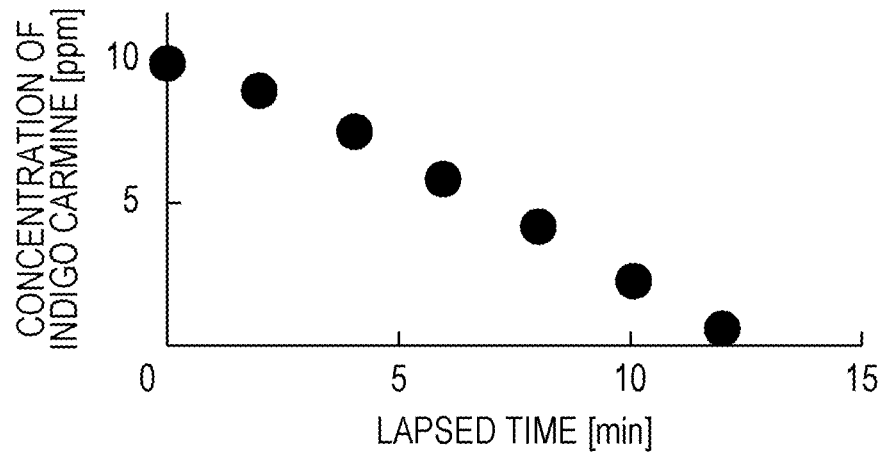
FIG. 4 is a graph plotting an initial decomposition characteristic of indigo carmine in the liquid treatment apparatus according to the first embodiment.

A decomposition rate of a chemical substance (organic substance) in the case of performing only the plasma discharge will be described below with reference to FIG. 4. FIG. 4 is a graph plotting an initial decomposition characteristic of indigo carmine in the liquid treatment apparatus 100 according to this embodiment. In FIG. 4, the horizontal axis denotes a lapse of treatment time, and the vertical axis denotes a concentration of indigo carmine. Here, the word "initial" stands for a stage immediately after starting the treatment of the treatment target water 109 by employing the liquid treatment apparatus 100 according to this embodiment, namely a state where no precipitate is deposited on the second electrode 103.

As plotted in FIG. 4, it is understood that, immediately after starting the treatment of the treatment target water 109 by employing the liquid treatment apparatus 100 according to this embodiment, the concentration of indigo carmine reduces with the lapse of time and the chemical substance is decomposed. Though not plotted in the graph, however, the decomposition characteristic of indigo carmine, plotted in FIG. 4, gradually deteriorates with the lapse of time. In the case of employing water used in a district of Japan where hardness of drinking water is relatively high, the decomposition characteristic of indigo carmine reduces to a large extent in about 10 hours. Simultaneously, a large amount of precipitate on the second electrode 103 is observed. As described above, the resistance between the first electrode 102a and the second electrode 103 is significantly increased with deposition of the precipitate on the second electrode 103. This results in that the voltage applied to a discharge zone is reduced and the intensity of the plasma discharge is weakened, whereby the performance of decomposition of indigo carmine is reduced. Continuing such a state further increases the amount of precipitate deposited on the second electrode 103, and further increases the resistance between the first electrode 102a and the second electrode 103. Thus, the voltage applied to the discharge zone is further reduced. When the voltage applied to the discharge zone is reduced beyond a voltage necessary for exciting the discharge, the discharge can no longer be excited. In other words, sterilization of the treatment target water 109 or decomposition of the chemical substances contained in the treatment target water 109 is difficult to continue.

Figure 5:
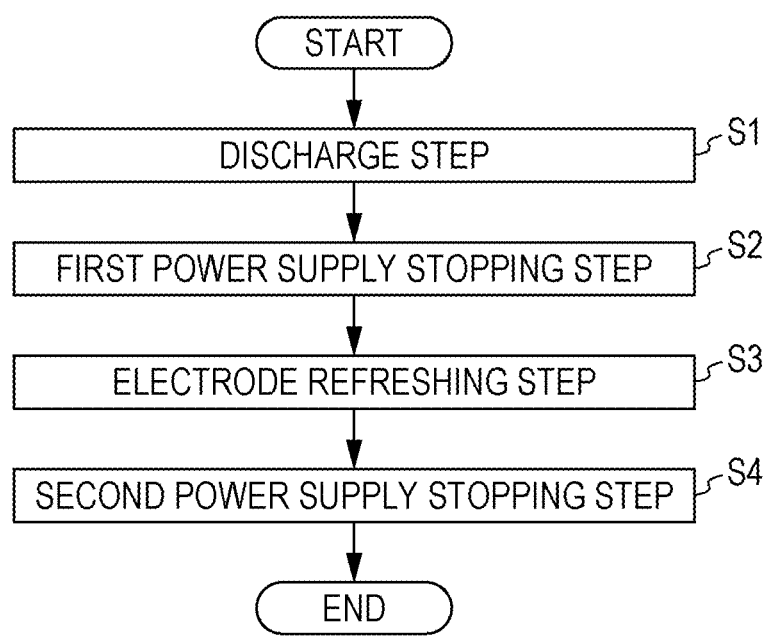
FIG. 5 is a flowchart illustrating an operation of the liquid treatment apparatus according to the first embodiment.

1-2-3. Case of Performing Plasma Discharge and Electrode Refreshing in Time Sharing Manner As described above, if only the plasma discharge is performed, namely if the electrode refreshing is not performed, the precipitate is deposited on the second electrode 103 to such an extent that the plasma discharge can no longer be continued under stable conditions. To cope with that problem, the electrode refreshing is performed to remove the precipitate having deposited on the second electrode 103. An operation of the liquid treatment apparatus 100 according to this embodiment in the case of performing the plasma discharge and the electrode refreshing will be described below with reference to FIG. 5. FIG. 5 is a flowchart illustrating the operation of the liquid treatment apparatus 100 according to this embodiment. The precipitate having deposited on the second electrode 103 is removed and the second electrode 103 is restored to a sound state by carrying out treatment in accordance with the flowchart. Here, the term "sound state" stands for a state where no precipitate is deposited on the second electrode 103, or a state where, though being precipitated, an amount of the precipitate is at such a level as not adversely affecting the discharge.

First, the bubble 111 covering the metal electrode portion 122 of the first electrode 102a is formed by the gas 110 supplied from the gas supply unit 105. In the state where the metal electrode portion 122 is covered with the bubble 111, the controller 140 controls the first power supply 104 to apply the voltage between the first electrode 102a and the second electrode 103. The voltage applied from the first power supply 104 is controlled, for example, in order that an effectively positive voltage is applied to the first electrode 102a with the second electrode 103 being a reference. Upon the application of the voltage, discharge occurs inside the bubble 111 (S1). With the occurrence of the discharge, the plasma 112 generates from the vicinity of the metal electrode portion 122 of the first electrode 102a toward the inside of the bubble 111. The plasma 112 produces OH radicals, etc. in the treatment target water 109, and these products sterilize the treatment target water 109 or decompose the chemical substances contained in the treatment target water 109.

With the continued discharge, as described above, the pH in the vicinity of the second electrode 103 increases and the precipitate deposits on the second electrode 103. At that timing, the controller 140 controls the first power supply 104 to stop the voltage that has been applied between the first electrode 102a and the second electrode 103 (S2).

Figure 6A:
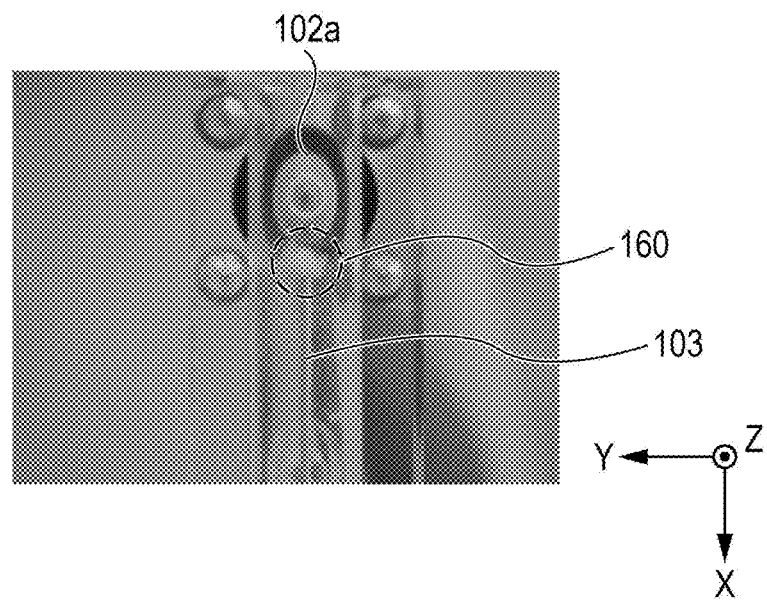
FIG. 6A illustrates a state of a second electrode before an electrode refreshing process in the liquid treatment apparatus according to the first embodiment.

FIG. 6A illustrates a state of the second electrode 103 before an electrode refreshing process in the liquid treatment apparatus 100 according to this embodiment. In other words, FIG. 6A illustrates a state of the second electrode 103 when the first power supply 104 stops the application of the voltage in the step S2. The electrode refreshing process is explained in connection with a step S3 described later. The state illustrated in FIG. 6A is obtained by observing the liquid treatment apparatus 100 according to this embodiment from a positive direction of a Z axis. As seen from FIG. 6A, a precipitate 160 (denoted by a broken line) deposits at part (tip portion) of the second electrode 103.

Figure 7A:
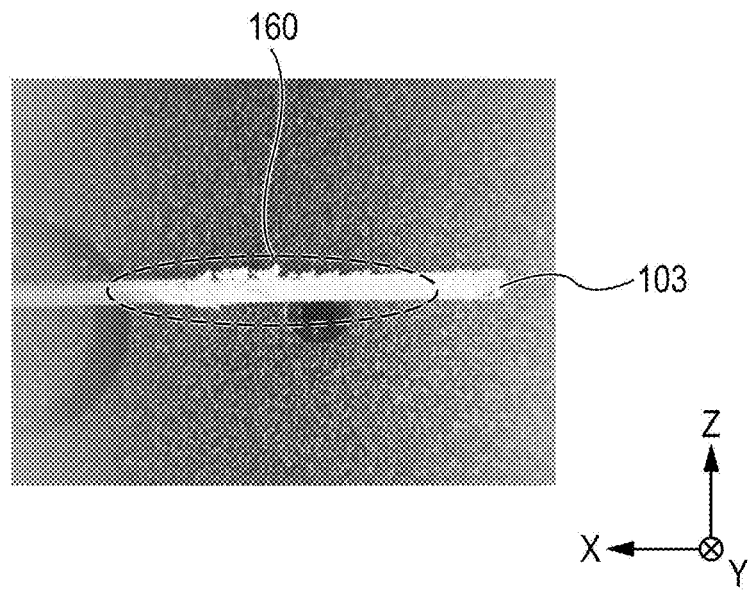
FIG. 7A is an enlarged view of the second electrode before the electrode refreshing process.

FIG. 7A is an enlarged view of the second electrode 103 before the electrode refreshing process. As seen from FIG. 7A, a precipitate 160 (denoted by a broken line) deposits on the surface of the second electrode 103. The difference in shape of the precipitate 160 between FIG. 6A and FIG. 7 depends on the composition of the treatment target water 109.

Then, the electrode refreshing to remove the precipitate having deposited on the second electrode 103 is performed with the second power supply 1004 applying the DC voltage between the second electrode 103 and the third electrode 1003 (S3). Control executed by the controller 140 in the step S3 is described, for example, in connection with the case where the first power supply 104 has been controlled in the step S1 such that an effectively positive voltage is applied to the first electrode 102a with the second electrode 103 being a reference. In that case, the controller 140 controls the second power supply 1004 in the step S3 in order that an effectively negative voltage is applied to the third electrode 1003 with the second electrode 103 being a reference. In other words, the controller 140 controls the second power supply 1004 in order that the voltage applied to the first electrode 102a in the step S1 and the voltage applied to the third electrode 1003 in the step S3 have opposite polarities with the second electrode 103 being a reference. The pH in the vicinity of the second electrode 103 having increased in the step S1 is reduced through the step S3. Thus, the dissoluble concentration of the precipitate into the treatment target water 109 in the vicinity of the second electrode 103 is increased. As a result, the precipitate having deposited on the second electrode 103 is re-dissolved into the treatment target water 109. It is sufficient to execute the process of the step S3 for several minutes on condition that a current of about 0.05 to 0.1 A can be supplied to flow between the two electrodes.

Although the pH in the vicinity of the second electrode 103 is reduced, the pH in the vicinity of the third electrode 1003 is increased, thus causing the precipitate to deposit on the third electrode 1003. Therefore, the third electrode 1003 may be replaced periodically.

After the end of the electrode refreshing process in the step S3, the controller 140 stops the voltage applied between the second electrode 103 and the third electrode 1003. In other words, the controller 140 stops the application of the voltage from the second power supply 1004 (S4). When further treatment of the treatment target water 109 is needed, the discharge step (i.e., the step S1) is executed again. In the liquid treatment apparatus 100 according to the first embodiment, the precipitate on the second electrode 103 can be removed by setting an electrode refreshing time to several minutes for a discharge time of 10 hours.

Figure 6B:
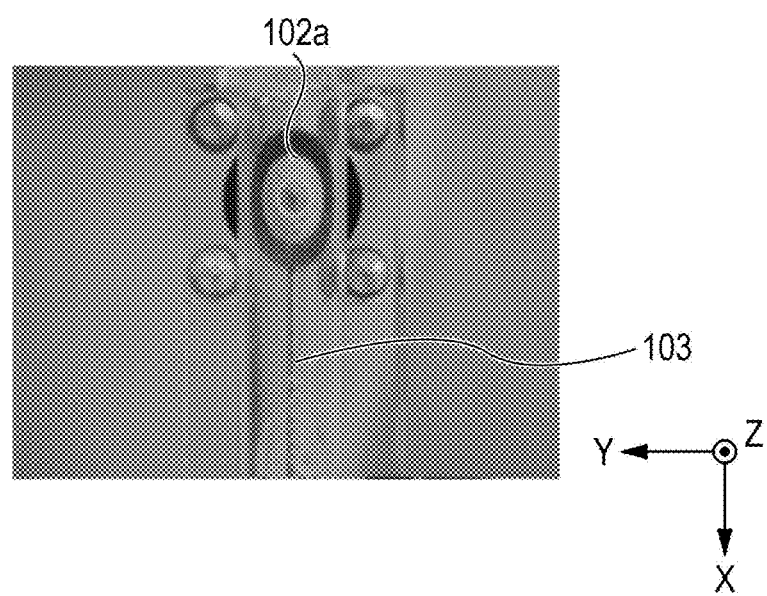
FIG. 6B illustrates a state of the second electrode after the electrode refreshing process in the liquid treatment apparatus according to the first embodiment.

FIG. 6B illustrates a state of the second electrode 103 after the electrode refreshing process in the liquid treatment apparatus 100 according to this embodiment. In other words, FIG. 6B illustrates a state of the second electrode 103 when the second power supply 1004 stops the application of the voltage in the step S4. As seen from FIG. 6B, the precipitate 160 having deposited before the electrode refreshing process (see FIG. 6A) is removed after the electrode refreshing process in the step S3. This proves that the precipitate having deposited on the second electrode 103 is re-dissolved into the treatment target water 109 with the electrode refreshing.

Figure 7B:
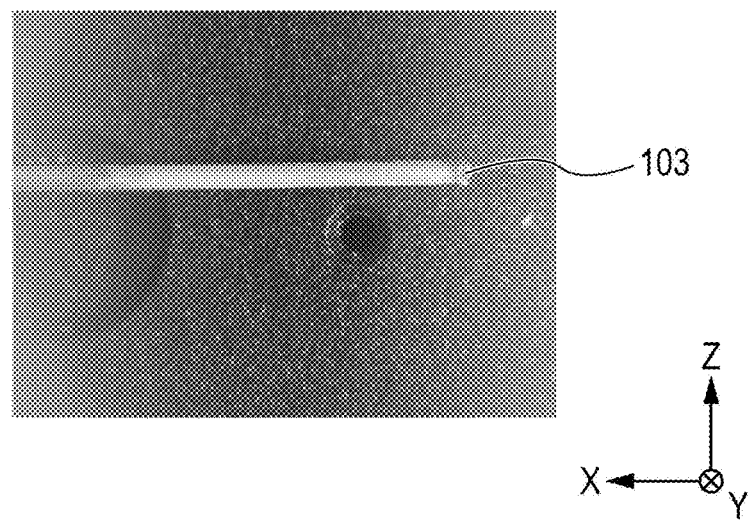
FIG. 7B is an enlarged view of the second electrode after the electrode refreshing process.

FIG. 7B is an enlarged view of the second electrode 103 after the electrode refreshing process. The state of the second electrode 103 before the electrode refreshing process is illustrated in FIG. 7A. As seen from FIG. 7B, the precipitate 160 cannot be found even after enlarging the vicinity of the second electrode 103. It is hence understood that the effect of the electrode refreshing process in the step S3 is significant.

The timing of ending the step S1, i.e., the timing of starting the step S3, is now described. Switching-over from the step S1 to the step S3 is performed by the controller 140. When a relation between a discharge time and an amount of the precipitate deposited on the second electrode 103, i.e., a relation between a discharge time and discharge intensity, is known in advance, the controller 140 may perform the switching-over to the step S3 after the lapse of a predetermined discharge time in the step S1. More specifically, when it is known that the discharge intensity reduces after the discharge time of 10 hours has lapsed, the controller 140 stops the application of the voltage from the first power supply 104 after the discharge has been continued for 10 hours in the step S1 with the application of the voltage from the first power supply 104. Then, in the step S3, the controller 140 controls the second power supply 1004 to apply the voltage and to perform the electrode refreshing. The discharge time is not limited to the above-mentioned example. The controller 140 may end the step S1 and start the step S3 in accordance with instructions from a user operating the liquid treatment apparatus. Alternatively, the time and the number at which the electrode refreshing is to be performed periodically, e.g., twice per day at predetermined times, may be set in advance, and the controller 140 may perform the electrode refreshing in accordance with the setting. Other suitable methods may also be optionally used for the switching-over of the step.

Figure 8:
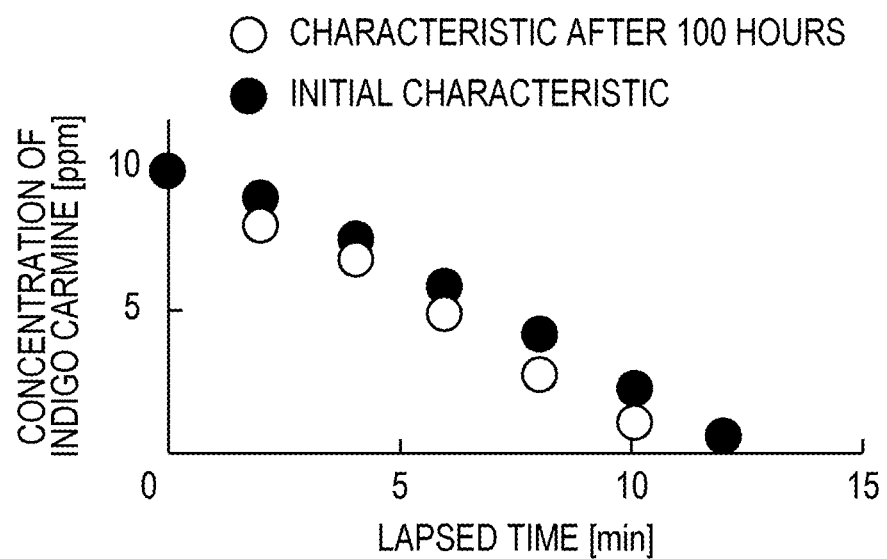
FIG. 8 is a graph plotting a decomposition characteristic of indigo carmine when the operation illustrated in FIG. 5 is performed in the liquid treatment apparatus according to the first embodiment.

Decomposition rates of a chemical substance in an initial stage and after the electrode refreshing performed in the liquid treatment apparatus 100 according to this embodiment will be described below with reference to FIG. 8. FIG. 8 is a graph plotting an initial decomposition characteristic of indigo carmine (denoted by black circles in FIG. 8), and a decomposition characteristic of indigo carmine after the discharge and the electrode refreshing process have been performed for a total time of 100 hours in accordance with the flowchart of FIG. 5 (denoted by white circles in FIG. 8). In FIG. 8, the horizontal axis and the vertical axis denote the same parameters as those in FIG. 4. Here, the word "initial" stands for a stage immediately after starting the treatment of the treatment target water 109 by employing the liquid treatment apparatus 100 according to this embodiment, namely a state where no precipitate is deposited on the second electrode 103.

From the results plotted in FIG. 8, it is understood that the decomposition characteristic after performing the operation for 100 hours in accordance with the flowchart of FIG. 5 can be maintained substantially at the same level as the initial decomposition characteristic. Stated in another way, it is understood that, by performing the electrode refreshing, the liquid treatment apparatus 100 according to this embodiment can maintain the stable water treatment performance even after the operation for 100 hours. Here, the word "stable" stands for that, even after continuing the plasma discharge, the water treatment performance is held substantially at the same level as the performance immediately after starting the treatment of the treatment target water 109 by the liquid treatment apparatus 100 according to this embodiment, namely in the state where no precipitate is deposited on the second electrode 103.

The concentration of indigo carmine at the lapse time of 0 minute in FIG. 8 is the same between the initial decomposition characteristic and the characteristic after performing the operation for 100 hours in accordance with the flowchart of FIG. 5. Therefore, only the initial decomposition characteristic is plotted. Though not plotted, the decomposition characteristic of indigo carmine after continuing the discharge for 100 hours without performing the electrode refreshing in the step S3 has a tendency that the concentration of indigo carmine becomes harder to reduce with the lapse of time. Thus, in the case of not performing the electrode refreshing, it becomes difficult to decompose indigo carmine. The reason is that, with the precipitate deposited on the second electrode 103, the resistance between the first electrode 102a and the second electrode 103 is increased significantly and the intensity of the plasma discharge is weakened, whereby the performance of decomposition of indigo carmine is reduced.

1-3. Advantageous Effects and so on

As described above, the liquid treatment apparatus 100 according to this embodiment includes the housing 101 that stores the treatment target water 109, the first electrode 102*a* at least part of which is arranged inside the housing 101, the second electrode 103, and the third electrode 1003, the first power supply 104 that applies the voltage between the first electrode 102*a* and the second electrode 103, and the second power supply 1004 that applies the voltage between the second electrode 103 and the third electrode 1003, wherein the first power supply 104 applies the voltage between the first electrode 102*a* and the second electrode 103 to cause discharge inside the bubble 111 contained in the treatment target water 109, thus generating the plasma 112.

With the features described above, in the liquid treatment apparatus 100 according to the present disclosure, the first power supply 104 applies the voltage between the first electrode 102*a* and the second electrode 103 to cause discharge, and the plasma 112 generated with the discharge produces OH radicals, etc. Thus, the liquid treatment apparatus 100 according to the present disclosure can produce a liquid having oxidizing power. Furthermore, the precipitate having deposited on the second electrode 103 and containing Ca and/or Mg can be re-dissolved into the treatment target water 109 with the second power supply 1004 applying the voltage between the second electrode 103 and the third electrode 1003. Thus, the precipitate having deposited on the second electrode can be removed. As a result, the liquid treatment apparatus 100 according to the present disclosure can suppress a rise of the impedance between the first electrode 102*a* and the second electrode 103, the rise being attributable to the precipitate having deposited on the second electrode 103. Stated in another way, stability of the plasma discharge can be suppressed from reducing with the rise of the impedance. Hence the liquid treatment apparatus 100 according to the present disclosure is able to continuously produce the liquid having oxidizing power, and to maintain the stable water treatment performance.

Furthermore, the second electrode 103 is made of the inoxidizable material.

The above feature can suppress the occurrence of such an event that an oxide of the constituent material of the second electrode 103 comes into a passive state and a current can no longer flow continuously.

Moreover, the liquid treatment apparatus 100 according to the present disclosure includes the controller 140. The controller 140 controls the first power supply 104 to apply the voltage between the first electrode 102*a* and the second electrode 103, thereby causing discharge inside the bubble 111 contained in the treatment target water 109 and generating the plasma 112, and then controls the second power supply 1004 to apply the voltage between the second electrode 103 and the third electrode 1003, thereby carrying out cleaning (refreshing) of the second electrode 103.

With the features described above, since the voltage is applied between the second electrode 103 and the third electrode 1003 after causing the discharge between the first electrode 102*a* and the second electrode 103, the precipitate having deposited on the second electrode 103 during the discharge can be re-dissolved into the treatment target water 109. Stated in another way, with the liquid treatment apparatus 100 according to the present disclosure, since the precipitate having deposited on the second electrode 103 can be removed, a rise of the impedance between the first electrode 102*a* and the second electrode 103 can be suppressed, the rise being attributable to the precipitate having deposited on the second electrode 103. As a result, the liquid treatment apparatus 100 according to the present disclosure can continue the plasma discharge under stable conditions. In other words, the liquid treatment apparatus 100 according to the present disclosure is able to continuously produce the liquid having oxidizing power, and to maintain the stable water treatment performance.

Another aspect of the present disclosure provides a liquid treatment method for the liquid treatment apparatus 100 that treats the treatment target water 109 by generating the plasma 112, the liquid treatment apparatus 100 including the first electrode 102*a* that is at least partly arranged inside the housing 101 through which the treatment target water 109 flows, the second electrode 103, and the third electrode 1003, wherein the liquid treatment method includes the discharge step (S1) of applying the voltage between the first electrode 102*a* and the second electrode 103 to cause discharge inside the bubble 111 contained in the treatment target water 109, thus generating the plasma 112, and the electrode refreshing step (S3) of, after the discharge step, applying the voltage between the second electrode 103 and the third electrode 1003 to perform cleaning of the second electrode 103.

Thus, the liquid treatment method according to the present disclosure has similar advantageous effects to those obtained with the liquid treatment apparatus 100.

Second Embodiment

A second embodiment will be described below with reference to FIG. 9.

2-1. Configuration

A liquid treatment apparatus according to the second embodiment is described. The second embodiment is described only about different components from those in the first embodiment, and description of the same components as those in the first embodiment is omitted. FIG. 9 is a sectional view illustrating an example of configuration of an electrode unit 150*b* in the liquid treatment apparatus according to the second embodiment. As illustrated in FIG. 9, the electrode unit 150*b* in the second embodiment includes an insulator 206 that is arranged in a covering relation to a first electrode 102*b*. The second embodiment is different from the first embodiment in shape of the first electrode 102*b* and arrangement of the insulator 206. The other configuration of the second embodiment is similar to that of the first embodiment. The electrode unit 150*b* in the second embodiment will be described below.

2-2-1. First Electrode and Insulator

Figure 9:
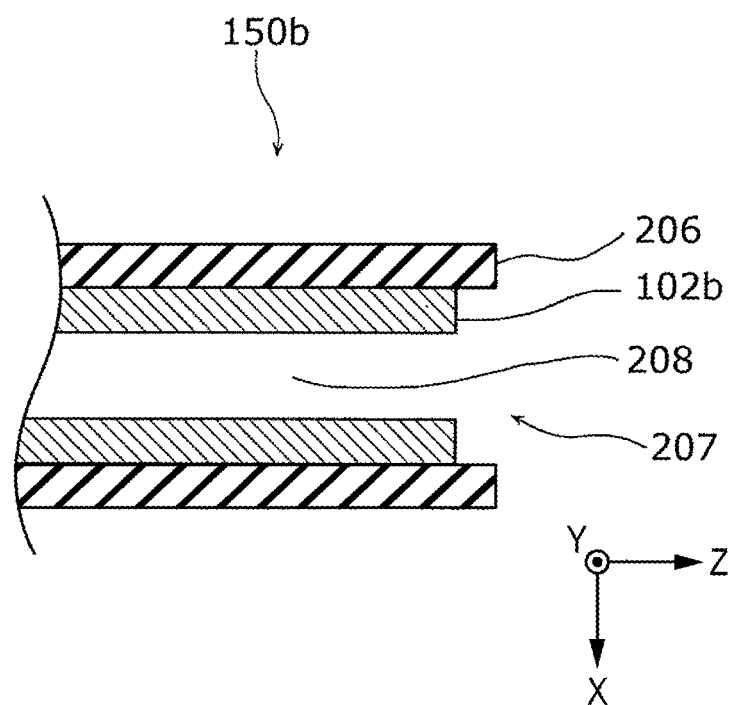
FIG. 9 is a sectional view illustrating an example of configuration of an electrode unit in a liquid treatment apparatus according to a second embodiment.

As illustrated in FIG. 9, the electrode unit 150*b* in this embodiment includes the first electrode 102*b* and the insulator 206. The first electrode 102*b* is formed of a metal material having a hollow cylindrical shape. The first electrode 102*b* may have an inner diameter of 0.4 mm and an outer diameter of 0.6 mm, for example. The first electrode 102*b* has a space 208 formed therein to which the gas 110 is supplied.

The insulator 206 is arranged in contact with an outer peripheral surface of the first electrode 102*b* such that there is no gap between the insulator 206 and the first electrode 102*b*. In the first electrode 102*b*, metal is exposed only in an end surface and an inner peripheral surface. Because the insulator 206 is arranged in contact with the outer peripheral surface of the first electrode 102*b* without forming a gap therebetween, the outer peripheral surface of the first electrode 102*b* is kept from directly contacting the treatment target water 109. A wall thickness of the insulator 206 may be 0.1 mm, for example. In addition, the insulator 206 has an opening 207.

2-2. Operation

The operation of the liquid treatment apparatus according to the second embodiment will be described below. Only different points from those in the first embodiment are described, and description of the same points as those in the first embodiment is omitted. Referring to FIG. 5, the second embodiment is different from the first embodiment in a discharge step (step S1), and steps S2 to S4 are the same as those in the first embodiment. The discharge step in the second embodiment will be described below.

The gas 110 is supplied to the space 208 in the first electrode 102b by the gas supply unit 105. The supplied gas 110 is continuously released into the treatment target water 109 in the housing 101 from the opening 207 of the insulator 206, whereby the bubble 111 is formed inside the treatment target water 109 in the housing 101. The bubble 111 covers the opening 207 of the insulator 206 with the gas 110 in the bubble 111. The bubble 111 is formed over a certain distance from the opening 207 of the insulator 206. Thus, in this embodiment, the opening 207 of the first electrode 102b functions also as a portion for generating the bubble 111. A state where a region near the opening 207 of the insulator 206, i.e., the end surface of the first electrode 102b in which metal is exposed, is covered with the gas 110 in the bubble 111 can be obtained by adjusting an amount of the gas 110 supplied from the gas supply unit 105. Looking at the bubble 111 covering the end surface of the first electrode 102b, a gas-liquid interface at which the gas 110 in the bubble 111 and the treatment target water 109 present in the surroundings of the bubble 111 are contacted with each other is defined not only within the liquid, but also at an interface at which the gas 110 in the bubble 111 and the insulator 206 are contacted with each other. In other words, the gas-liquid interface defining the bubble 111 is not "closed" in the treatment target water 109. The bubble 111 is in contact with the insulator 206 near the opening 207 of the insulator 206. As described above, in the outer surface of the first electrode 102b, the conductor is exposed only in the end surface of the first electrode 102b near the opening 207. By generating the bubble 111 so as to cover the exposed end surface, therefore, the outer surface of the first electrode 102b is isolated from the treatment target water 109 with intervention of both the bubble 111 and the insulator 206 therebetween. The inner peripheral surface of the first electrode 102b is not directly contacted with the treatment target water 109 because it is covered with the supplied gas 110 when the bubble 111 is formed.

Then, in the state where the conductor exposed portion of the first electrode 102b is covered with the bubble 111, the controller 140 controls the first power supply 104 to apply the voltage between the first electrode 102b and the second electrode 103. Upon the application of the voltage between the first electrode 102b and the second electrode 103, discharge occurs inside the bubble 111, and the plasma 112 generates in the vicinity of the first electrode 102b. While the plasma 112 spreads over the entirety of the bubble 111, the plasma 112 is generated at a higher density particularly in the vicinity of the first electrode 102b.

2-3. Advantageous Effects

The liquid treatment apparatus according to this embodiment includes the electrode unit 150b including the first electrode 102b, and the gas supply unit 105 that supplies the gas 110 to the space 208 formed by the hollow portion of the first electrode 102b. With that feature, the liquid treatment apparatus according to this embodiment can generate the bubble 111 extending from the opening 207 of the insulator 206 with the aid of the gas 110 supplied from the gas supply unit 105. Furthermore, the liquid treatment apparatus according to this embodiment can cause discharge inside the bubble 111 contained in the treatment target water 109 and can generate the plasma 112, thereby producing OH radicals, etc. As a result, this embodiment is also able to efficiently generate the plasma 112 inside the bubble 111, and to perform the treatment of the treatment target water 109 in a short time.

Third Embodiment

A third embodiment will be described below with reference to FIG. 10.

3-1. Configuration

A liquid treatment apparatus according to the third embodiment is described. The third embodiment is described only about different components from those in the first embodiment, and description of the same components as those in the first embodiment is omitted. FIG. 10 is a sectional view illustrating an example of configuration of an electrode unit 150c in the liquid treatment apparatus according to the third embodiment. As illustrated in FIG. 10, the electrode unit 150c in the third embodiment includes a first electrode 102c, a holding block 321, and an insulator 306. The third embodiment is different from the first embodiment in respective shapes of the first electrode 102c and the insulator 306. In addition, though not seen from the drawing, the third embodiment does not include the gas supply unit 105. The other configuration of the third embodiment is similar to that of the first embodiment. The electrode unit 150c in the third embodiment will be described below.

3-1-1. First Electrode

Figure 10:
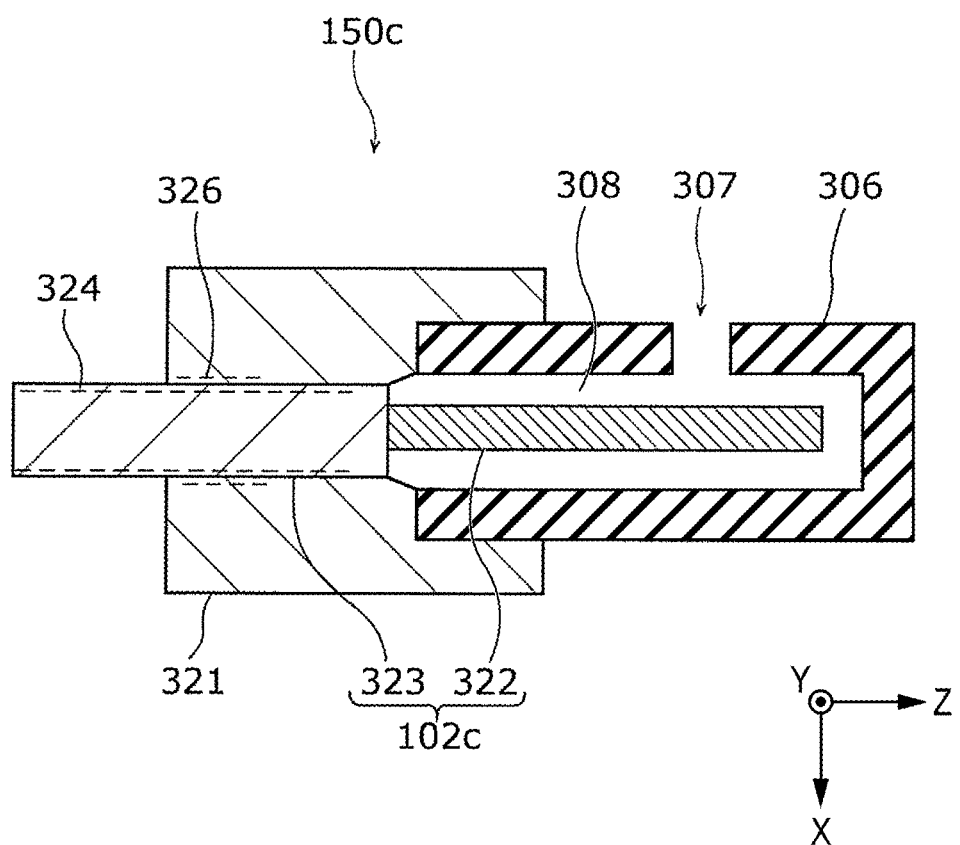
FIG. 10 is a sectional view illustrating an example of configuration of an electrode unit in a liquid treatment apparatus according to a third embodiment.

As illustrated in FIG. 10, the first electrode 102c includes a metal electrode portion 322 and a metal fixation portion 323. The metal electrode portion 322 has a circular columnar shape with a diameter of 2 mm, for example. However, the diameter and the shape of the metal electrode portion 322 are not limited to those examples.

The first electrode 102c is fitted to and held by the holding block 321. In other words, there is no gap between the first electrode 102c and the holding block 321, and the holding block 321 is arranged in contact with an outer peripheral surface of the first electrode 102c. Furthermore, the metal fixation portion 323 of the first electrode 102c does not include the through-hole 125 unlike the metal fixation portion 123 of the first electrode 102a in the first embodiment. Thus, the liquid treatment apparatus according to this embodiment has a structure not allowing gas to be supplied from the outside.

3-1-2. Insulator

The insulator 306 is arranged so as to form a space 308 around the metal electrode portion 322 of the first electrode 102c, and it has insulation properties. The insulator 306 has a circular cylindrical shape with an inner diameter of 3 mm and an outer diameter of 5 mm, for example. However, the size and the shape of the insulator 306 are not limited to those examples. A central axis of the insulator 306 and a central axis of the metal electrode portion 322 may be arranged in alignment with each other. In other words, a central axis of the space 308 and the central axis of the metal electrode portion 322 may be arranged in alignment with each other.

The insulator 306 has an opening 307. The opening 307 is, for example, in the form of a circular columnar hole with a diameter of 0.7 mm. However, the shape and the diameter of the opening 307 are not limited to those examples. The position of the opening 307 is not limited to particular one. The opening 307 may be formed in a plural number in the insulator 306.

3-2. Operation

The operation of the liquid treatment apparatus according to this embodiment will be described below. Only different points from those in the first embodiment are described, and description of the same points as those in the first embodiment is omitted. Referring to FIG. 5, the third embodiment is different from the first embodiment in a discharge step (step S1), and steps S2 to S4 are the same as those in the first embodiment. The discharge step in the third embodiment will be described below.

Before starting the treatment of the treatment target water 109, the space 308 defined by the metal electrode portion 322 of the first electrode 102c and the insulator 306 is in a state filled with the treatment target water 109. In other words, a current path (electrical conduction) is formed between the first electrode 102c and the second electrode 103 with the presence of the treatment target water 109. When, in such a state, the controller 140 controls the first power supply 104 to apply the voltage between the first electrode 102c and the second electrode 103, a current flows between both the electrodes through the treatment target water 109. Heat is generated with flowing of the current, and the treatment target water 109 is vaporized with the generated heat, whereby gas is produced. Thus, in the liquid treatment apparatus according to this embodiment, gas can be produced with the vaporization of the treatment target water 109 without the need of supplying the gas 110 from the gas supply unit 105.

When the generated gas passes through the opening 307, the treatment target water 109 in the opening 307 is replaced with the gas. Therefore, the current path formed between the first electrode 102c and the second electrode 103 is cut off (namely, both the electrodes are isolated from each other), thus causing discharge in the gas and generating the plasma 112. The plasma 112 produces OH radicals, etc. in the treatment target water 109, and these products sterilize the treatment target water 109 or decompose the chemical substances contained in the treatment target water 109.

3-3. Advantageous Effects

The liquid treatment apparatus according to this embodiment includes the electrode unit 150c including the first electrode 102c and the insulator 306, the controller 140, and the first power supply 104. In the state where the space 308 defined by the first electrode 102c and the insulator 306 is filled with the treatment target water 109, the controller 140 controls the first power supply 104 to apply the voltage between the first electrode 102c and the second electrode 103. With the application of the voltage, the treatment target water 109 is vaporized and the bubble 111 is formed. Stated in another way, the first power supply 104 applies the voltage between the first electrode 102c and the second electrode 103, whereby the treatment target water 109 is vaporized and the bubble 111 is formed.

Thus, discharge can be caused inside the formed bubble 111 to generate the plasma 112, and OH radicals, etc. can be produced. As a result, the plasma 112 can be generated and the treatment of the treatment target water 109 can be performed with a relatively simple configuration not including the gas supply unit 105.

Fourth Embodiment

A fourth embodiment will be described below with reference to FIG. 11.

4-1. Configuration

The fourth embodiment is described only about different components from those in the first embodiment, and description of the same components as those in the first embodiment is omitted. FIG. 11 is a schematic view illustrating an example of overall configuration of a liquid treatment apparatus 200 according to the fourth embodiment. As illustrated in FIG. 11, the liquid treatment apparatus 200 according to the fourth embodiment includes a housing 401, an electrode unit 150d, and a second electrode 103d, the electrode unit 150d including a first electrode 102d, a holding block 421, and an insulator 406. The fourth embodiment is different from the first embodiment in respective shapes and arrangements of the housing 104, the electrode unit 150d, and the second electrode 103d. Another difference is that the fourth embodiment does not include the gas supply unit 105. The other configuration of the fourth embodiment is similar to that of the first embodiment. The liquid treatment apparatus 200 according to the fourth embodiment will be described below.

4-1-1. Housing

Figure 11:
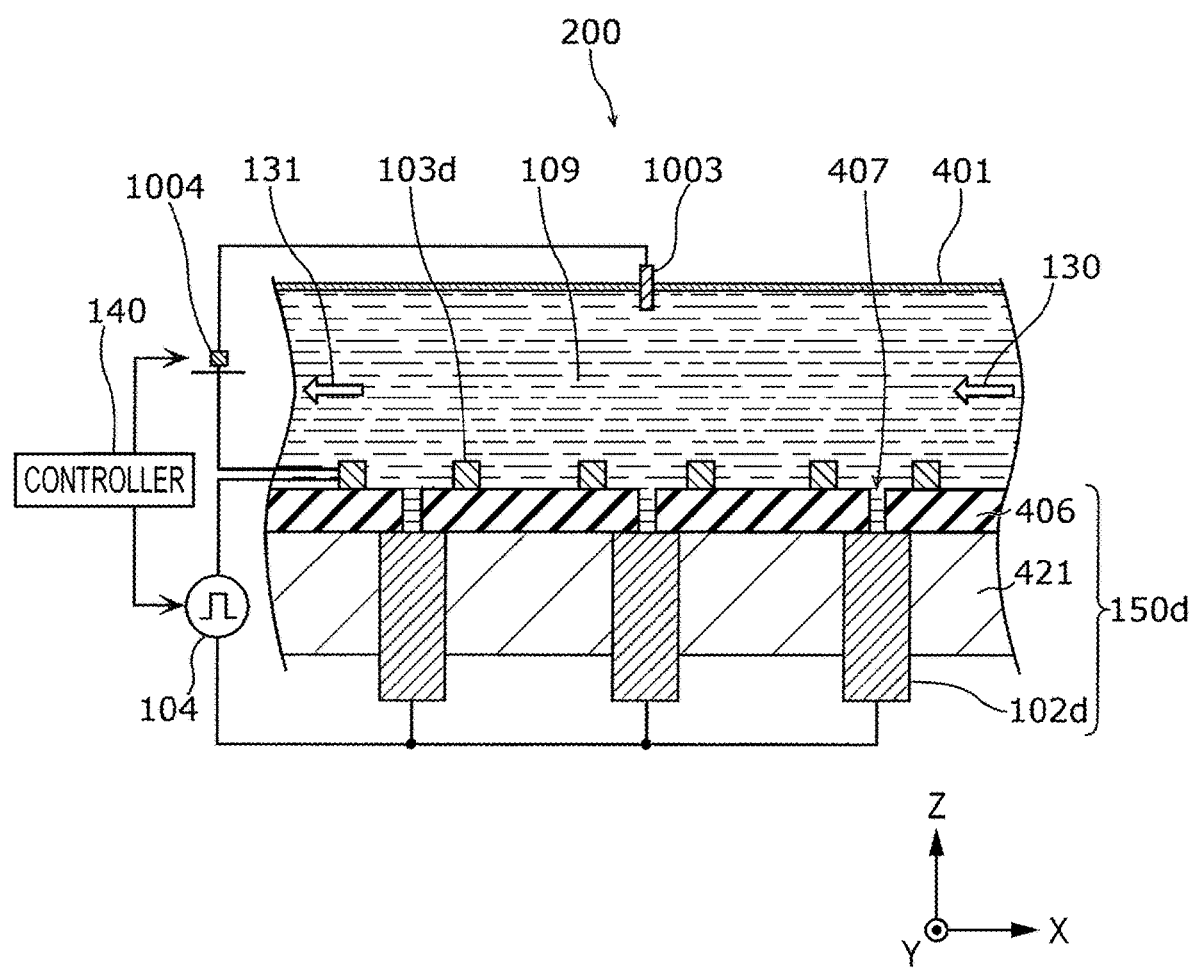
FIG. 11 is a schematic view illustrating an example of overall configuration of a liquid treatment apparatus according to a fourth embodiment.
Figure 12:
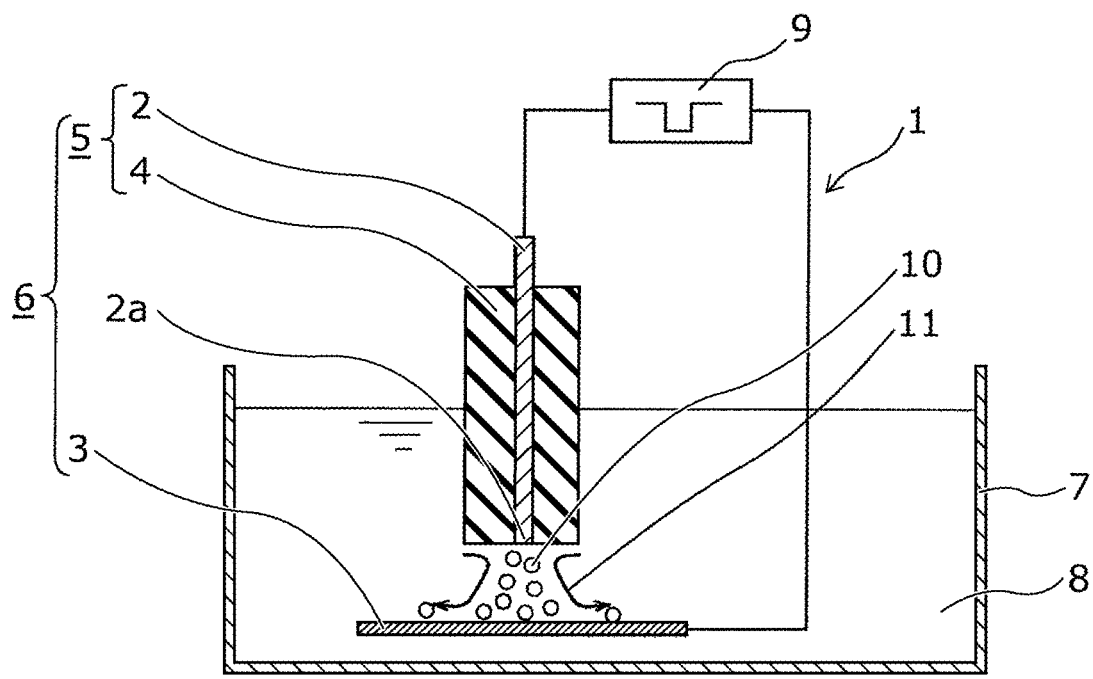
FIG. 12 illustrates a configuration of a related-art liquid treatment apparatus.

As illustrated in FIG. 11, by way of example, the treatment target water 109 flows in the housing 401 from the upstream side (denoted by an arrow 130) toward the downstream side (denoted by an arrow 131). In other words, the housing 401 forms a flow path for the treatment target water 109. The interior of the housing 401 is, for example, filled with the treatment target water 109. More specifically, the housing 401 is, for example, a pipe through which the treatment target water 109 flows. The treatment target water 109 is not always needed to be flowing (moving) water and may be static water. Thus, the housing 401 may form a space for storing the treatment target water 109.

The housing 401 may be constituted in any suitable shape and/or size insofar as it is a pipe-like member. A cross-section of the housing 401 may have, for example, one of rectangular, triangular, and other polygonal shapes.

The housing 401 may be grounded to prevent electric shock.

4-1-2. Electrode Unit

The electrode unit 150d used in the liquid treatment apparatus 200 and including the first electrode 102d will be described below. The electrode unit 150d illustrated in FIG. 11 includes the first electrode 102d, the insulator 406, and the holding block 421.

4-1-2-1. First Electrode

The first electrode 102d functions as a reaction electrode in the process of generating the plasma 112. The first electrode 102d is, for example, an electrode having a circular columnar shape and held by the holding block 421. The first electrode 102d has a diameter of 1 mm, for example. However, the shape and the diameter of the first electrode 121d are not limited to the above-mentioned examples. In another example, the first electrode 102d may have a rectangular columnar, spherical, or conical shape.

The first electrode 102d is fitted to and held by the holding block 421. In other words, there is no gap between the first electrode 102d and the holding block 421, and the holding block 421 is arranged in contact with an outer peripheral surface of the first electrode 102d. Furthermore, the first electrode 102d does not include the through-hole 125 unlike the first electrode 102a in the first embodiment. Thus, the liquid treatment apparatus 200 according to this embodiment has a structure not allowing gas to be supplied from the outside. In addition, an end surface of the first electrode 102d is positioned to partly face an opening 407.

While FIG. 11 illustrates an example in which three first electrodes 102d are arranged, this embodiment is not limited to the illustrated example. The number of the first electrodes 102d to be arranged may be one or four or more.

4-1-2-2. Insulator

The insulator 406 is a plate member having insulation properties and arranged between the first electrode 102d and an inner space of the housing 401 through which the treatment target water 109 flows. In other words, one surface of the insulator 406 contacts the treatment target water 109 (the surface of the insulator 406 in contact with the treatment target water 109 being referred to as a "principal surface" of the insulator 406 hereinafter). The insulator 406 is, for example, a rectangular flat plate with a thickness of 0.3 mm, a length of 3 cm, and a width of 3 cm. However, the shape and the thickness of the insulator 406 are not limited to the above-mentioned examples.

The insulator 406 is arranged in an opposing relation to the holding block 421. More specifically, the insulator 406 and the holding block 421 are arranged in contact with each other.

The insulator 406 has the opening 407. The opening 407 is in the form of, for example, a circular columnar hole. The hole has a diameter of 10 μm or more and 250 μm or less, for example. Furthermore, a central axis of the opening 407 and a central axis of the first electrode 102d may be arranged in alignment with each other.

4-1-2-3. Holding Block

The holding block 421 is an example of an insulating holder that is joined with the first electrode 102d and that holds the first electrode 102d. The holding block 421 is, for example, a substantially rectangular flat plate. However, the shape of the holding block 421 is not limited to such an example, and it may be optionally selected from other suitable shapes including circular and elliptic shapes. Moreover, the holding block 421 is not limited to a flat plate, and it may be a curved plate.

The holding block 421 has a hole penetrating therethrough in a thickness direction. The hole serves as a through-hole in which the first electrode 102d is to be held.

It is to be noted that the holding block 421 is not always needed, for example, in the case where the first electrode 102d is fixedly held by the insulator 406.

4-1-3. Second Electrode

The second electrode 103d functions as a counter electrode with respect to the first electrode 102d in the process of generating plasma. The second electrode 103d is arranged in the inner space of the housing 401 through which the treatment target water 109 flows. The second electrode 103d is arranged at a position where the second electrode 103d contacts the treatment target water 109 in the inner space of the housing 401. In this embodiment, the second electrode 103d is positioned in contact with the principal surface of the insulator 406.

The second electrode 103d is formed in a shape surrounding the opening 407. In other words, the second electrode 103d has a circular ring shape. The second electrode 103d may be arranged such that a center of the circular ring and the central axis of the opening 407 may be arranged in alignment with each other.

FIG. 11 illustrates an example in which three second electrodes 103d are arranged. Thus, the second electrode 103d and the first electrode 102d are arranged in the same number.

4-2. Operation

The operation of the liquid treatment apparatus 200 according to this embodiment will be described below. Only different points from those in the first embodiment are described, and description of the same points as those in the first embodiment is omitted. Referring to FIG. 5, the fourth embodiment is different from the first embodiment in a discharge step (step S1), and steps S2 to S4 are the same as those in the first embodiment. The discharge step in the fourth embodiment will be described below.

When the controller 140 controls the first power supply 104 to apply the voltage between the first electrode 102d and the second electrode 103d, the treatment target water 109 is forced to flow into the opening 407 (see FIG. 11). With the application of the voltage between the first electrode 102d and the second electrode 103d, for example, an electric field is generated between the first electrode 102d and the second electrode 103d, thus causing polarization in the treatment target water 109. By the action of the polarization, the treatment target water 109 is attracted toward the first electrode 102d and flows into the opening 407.

The treatment target water 109 having flowed into the opening 407 comes into contact with the first electrode 102d. Accordingly, a current path is formed between the first electrode 102d and the second electrode 103d by the treatment target water 109 having flowed into the opening 407.

When the current path is formed, a current flows between the first electrode 102d and the second electrode 103, and heat is generated. The generated heat vaporizes the treatment target water 109 having flowed into the opening 407, thereby producing gas. Thus, in the liquid treatment apparatus 200 according to this embodiment, gas can be produced with the vaporization of the treatment target water 109 without the need of supplying the gas 110 from the gas supply unit 105.

The gas produced with the vaporization of the treatment target water 109 covers the end surface of the first electrode 102d. Therefore, the current path formed between the first electrode 102d and the second electrode 103d is cut off, thus causing discharge in the gas and generating the plasma 112. The plasma 112 produces OH radicals, etc. in the treatment target water 109, and these products sterilize the treatment target water 109 or decompose the chemical substances contained in the treatment target water 109.

4-3. Advantageous Effects

The liquid treatment apparatus 200 according to this embodiment includes the electrode unit 150d including the first electrode 102d and the insulator 406, and the second electrode 103d. With the liquid treatment apparatus 200 according to this embodiment, in the state where the treatment target water 109 is in contact with the first electrode 102d, the voltage is applied between the first electrode 102d and the second electrode 103d to vaporize the treatment target water 109. The gas produced with the vaporization of the treatment target water 109 forms the bubble 111 in the opening 407 of the insulator 406. Stated in another way, the first power supply 104 applies the voltage between the first electrode 102d and the second electrode 103d, whereby the treatment target water 109 is vaporized and the bubble 111 is formed. As a result, the fourth embodiment provides similar advantageous effects to those obtained with the third embodiment.

Other Embodiments

While the liquid treatment apparatuses according to one or more aspects have been described in connection with the embodiments, the present disclosure is not limited to those embodiments. Not only various modifications of the above embodiments, which are conceivable by those skilled in the art, but also embodiments constituted by combining the constituent elements of the above different embodiments are also included within the scope of the present disclosure without departing from the gist of the present disclosure.

For example, while the different electrode units 150a to 150d are described in the above first to fourth embodiments, the present disclosure is not limited to those embodiments. The electrode units 150a to 150d including the first electrodes 102a to 102d, respectively, are just needed to be able to generate the plasma 112 in the treatment target water 109 and to produce the radicals.

While the lengthwise direction of the first electrodes 102a to 102d is described above as being perpendicular to the flowing direction of the treatment target water 109 in the housing 101, the first electrodes 102a to 102d in the liquid treatment apparatuses 100 and 200 according to the present disclosure may be arranged at an angle optionally set relative to the housing 101. For example, the first electrodes 102a to 102d may be arranged such that the lengthwise direction of the first electrodes 102a to 102d is not parallel to the flowing direction of the treatment target water 109 in the housing 101.

By changing the arrangement of the electrode units 150a to 150d as described above, the shape and the size of the liquid treatment apparatus can be adjusted. Thus, the liquid treatment apparatuses 100 and 200 according to the present disclosure can be used even in the case where there are restrictions on the shape and the size of the liquid treatment apparatus depending on uses and applications, for example.

While the step of refreshing the second electrode 103 or 103d (i.e., the step S3) is performed after the discharge, another step of refreshing the third electrodes 1003 (i.e., a second refreshing step) may be further performed after the step of refreshing the second electrode 103 or 103d. More specifically, in the step S3, the controller 140 controls the second power supply 1004 in order that an effectively negative voltage is applied to the third electrode 1003 with the second electrode 103 or 103d being a reference. In the second refreshing step after the step S3, the controller 140 controls the second power supply 1004 in order that an effectively positive voltage is applied to the third electrode 1003 with the second electrode 103 or 103d being a reference. In other words, a voltage having an opposite polarity to that applied between the second electrode 103 or 103d and the third electrode 1003 in the step S3 is applied in the second refreshing step.

Thus, the precipitate having deposited on the third electrode 1003 in the step S3 due to an increase of pH in the vicinity of the third electrode 1003 can be removed by applying, to the third electrode 1003, the voltage having the opposite polarity to that applied in the step S3 with the second electrode 103 or 103d being a reference. Stated in another way, a rise of impedance between the second electrode 103 or 103d and the third electrode 1003 can be suppressed. As a result, the effect of cleaning the second electrode 103 or 103d in the step S3 can be maintained. In addition, the service life of the third electrode 1003 can be prolonged, and the replacement frequency of the third electrode 1003 can be reduced.

In the switching-over from one to another in the steps S1 to S4 of FIG. 5, it is also possible to employ a sensor for detecting pH, and to end the step S1 (discharge step) and start the step S3 (electrode refreshing step) when the pH detected by the sensor exceeds a predetermined value.

With the modification described above, the pH in the vicinity of the second electrode 103 or 103d can be avoided from increasing in excess of the predetermined value, and an amount of the precipitate deposited on the second electrode 103 or 103d can be prevented from increasing in excess of a certain value. Hence the discharge can be caused to occur in a state of keeping the discharge intensity at a certain level or higher.

While, in the above description, the controller 140 controls the first power supply 104 and the second power supply 1004, the present disclosure is not limited to such a case. In an alternative example, the controller 140 may control the gas supply unit 105 in addition to the first power supply 104 and the second power supply 1004.

With the modification described above, the controller 140 can execute control in a manner of supplying the gas 110 from the gas supply unit 105 when it is in a mode of controlling the first power supply 104, and stopping the supply of the gas 110 from the gas supply unit 105 when it is in a mode of controlling the second power supply 1004. In other words, since the operation of the gas supply unit 105 can be stopped when the gas 110 is not needed, energy saving is realized.

While the above description is made in connection with an example including one third electrode 1003, the present disclosure is not limited to such a case. The third electrode 1003 may be disposed in a plural number. For example, when the plurality of second electrodes 103 or 103d is disposed, the third electrode 1003 may be disposed in the same number as the second electrodes 103 or 103d.

With the modification described above, even when the plurality of second electrodes 103 or 103d is disposed, respective distances between the second electrodes 103 or 103d and the corresponding third electrodes 1003 can be held substantially constant. As a result, extents of removal of the precipitates having deposited on the second electrodes 103 or 103d can be made substantially equal to each other.

What is claimed is:

1. A liquid treatment apparatus comprising:
a housing for storing a liquid;
at least one first electrode;
at least one second electrode;
a third electrode;
a first power supply that, in operation, applies a first voltage between each of the at least one first electrode and each of the at least one second electrode to make the at least one first electrode held effectively positive with respect to each of the at least one second electrode; and
a second power supply that, in operation, applies a second voltage between each of the at least one second electrode and the third electrode to make the third electrode held effectively negative with respect to each of the at least one second electrode,
wherein plasma is generated inside a bubble, which is present in the liquid, when the liquid is stored in the housing and the first power supply applies the first voltage between each of the at least one first electrode and each of the at least one second electrode,
the housing is configured to allow the liquid to flow through the housing,
the at least one first electrode is arranged on a wall of the housing and along with the flow of the liquid,
the at least one second electrode is arranged on the wall of the housing and along with the flow of the liquid,
the third electrode arranged opposite side of the wall of the housing, and
each of the at least one second electrode surrounds a corresponding one of the at least one first electrode.

2. The liquid treatment apparatus according to claim 1, wherein each of the at least one second electrode is made of an inoxidizable material.

3. The liquid treatment apparatus according to claim 1, wherein the third electrode is made of a material having a lower level of ionization tendency than hydrogen.

4. The liquid treatment apparatus according to claim 1, wherein the second power supply is a direct-current power supply.

5. The liquid treatment apparatus according to claim 1, wherein the second power supply is a half-wave rectifier power supply.

6. The liquid treatment apparatus according to claim 1, wherein the bubble covers at least part of each of the at least one first electrode.

7. The liquid treatment apparatus according to claim 1, further comprising a gas supply unit that, in operation, supplies gas into the liquid,
wherein the bubble is generated with the gas supply unit supplying the gas into the liquid.

8. The liquid treatment apparatus according to claim 1, wherein the bubble is generated through vaporization of the liquid, the vaporization being caused with application of the first voltage between each of the at least one first electrode and each of the at least one second electrode.

9. The liquid treatment apparatus according to claim 1, further comprising a controller,
wherein the controller executes an operation of causing the first power supply to apply the first voltage between each of the at least one first electrode and each of the at least one second electrode, and generating the plasma inside the bubble, and
after generation of the plasma, the controller executes an operation of causing the second power supply to apply the second voltage between each of the at least one second electrode and the third electrode, and cleaning each of the at least one second electrode.

10. A liquid treatment method, using an apparatus according to claim 1, the method comprising:
applying a first voltage between each of the at least one first electrode and each of the at least one second electrode to generate plasma inside a bubble that is present in the liquid; and
after generating the plasma, applying a second voltage between each of the at least one second electrode and the third electrode to perform cleaning of each of the at least one second electrode.

11. The liquid treatment apparatus according to claim 1, wherein
the at least one first electrode comprises a plurality of first electrodes, and
the at least one second electrode comprises a plurality of second electrodes.

12. The liquid treatment apparatus according to claim 1, wherein
the third electrode extends through the wall of the housing so as to contact the liquid flowing through the housing.

* * * * *